United States Patent
Noh et al.

(10) Patent No.: US 11,737,635 B2
(45) Date of Patent: *Aug. 29, 2023

(54) MOVING ROBOT AND CONTROL METHOD THEREOF

(71) Applicant: LG ELECTRONICS INC., Seoul (KR)

(72) Inventors: Dongki Noh, Seoul (KR); Seungmyun Baek, Seoul (KR); Seungmin Baek, Seoul (KR); Sunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,935

(22) Filed: May 13, 2022

(65) Prior Publication Data

US 2022/0265106 A1    Aug. 25, 2022

Related U.S. Application Data

(63) Continuation of application No. 16/463,785, filed as application No. PCT/KR2017/013274 on Nov. 21, 2017, now Pat. No. 11,330,948.

(30) Foreign Application Priority Data

Nov. 24, 2016   (KR) .......................... 10-2016-0157552

(51) Int. Cl.
   *A47L 11/40*    (2006.01)
   *B25J 9/00*     (2006.01)
   (Continued)

(52) U.S. Cl.
   CPC ......... *A47L 11/4061* (2013.01); *A47L 9/2852* (2013.01); *B25J 9/0003* (2013.01);
   (Continued)

(58) Field of Classification Search
   CPC .. A47L 9/2852; A47L 2201/04; B25J 9/0003; B25J 9/1664; B25J 9/1674; B25J 11/0085; B25J 19/023; B25J 19/061
   See application file for complete search history.

(56) References Cited

U.S. PATENT DOCUMENTS 5,341,540 A * 8/1994 Soupert ............... A47L 11/4061
                                                   180/169
2005/0237189 A1  10/2005 Tani
(Continued)

FOREIGN PATENT DOCUMENTS

WO   WO 2008/030054   3/2008
WO   WO 2016/180796   11/2016

OTHER PUBLICATIONS

European Search Report dated Jun. 23, 2020 issued in Application No. 17874188.0.
(Continued)

*Primary Examiner* — Kira Nguyen
(74) *Attorney, Agent, or Firm* — Ked & Associates LLP

(57) ABSTRACT

Disclosed is a moving robot including: a travel unit configured to move a body; an image acquisition unit configured to acquire a surrounding image of the body; a sensor unit having one or more sensors configured to detect an obstacle while the body moves; a controller configured to: upon detection of an obstacle by the sensor unit, recognize an attribute of the obstacle based on an image acquired by the image acquisition unit, and control driving of the travel unit based on the attribute of the obstacle; and a sound output unit configured to: output preset sound when the recognized attribute of the obstacle indicates a movable obstacle. Accordingly, the moving robot improves stability, user convenience, driving efficiency, and cleaning efficiency.

20 Claims, 29 Drawing Sheets

(51) Int. Cl.
*A47L 9/28* (2006.01)
*B25J 9/16* (2006.01)
*B25J 11/00* (2006.01)
*B25J 19/02* (2006.01)
*B25J 19/06* (2006.01)
*G06V 10/764* (2022.01)
*G06V 10/82* (2022.01)
*G06V 20/10* (2022.01)

(52) U.S. Cl.
CPC .......... *B25J 9/1664* (2013.01); *B25J 9/1674* (2013.01); *B25J 11/0085* (2013.01); *B25J 19/023* (2013.01); *B25J 19/061* (2013.01); *G06V 10/764* (2022.01); *G06V 10/82* (2022.01); *G06V 20/10* (2022.01); *A47L 2201/04* (2013.01)

(56) References Cited

U.S. PATENT DOCUMENTS

| | | | | |
|---|---|---|---|---|
| 2009/0198380 A1* | 8/2009 | Friedman | ................ | A47L 9/009 901/1 |
| 2014/0324271 A1* | 10/2014 | Oh | ....................... | G05D 1/0246 701/28 |
| 2015/0032260 A1* | 1/2015 | Yoon | ..................... | A47L 9/2857 700/257 |
| 2015/0250372 A1* | 9/2015 | T P | ........................ | A47L 9/2826 701/28 |
| 2016/0057925 A1* | 3/2016 | Letsky | ................ | G05D 1/0274 701/23 |
| 2016/0059416 A1 | 3/2016 | Tian | | |
| 2016/0154996 A1 | 6/2016 | Shin et al. | | |
| 2016/0167226 A1* | 6/2016 | Schnittman | ........ | G06V 30/1916 901/1 |
| 2017/0049288 A1* | 2/2017 | Knutson | ............. | A47L 11/4083 |
| 2017/0344013 A1 | 11/2017 | Haegermarck | | |

OTHER PUBLICATIONS

U.S. Office Action dated May 10, 2021 issued in parent U.S. Appl. No. 16/463,785.

U.S. Notice of Allowance dated Jan. 18, 2022 issued in parent U.S. Appl. No. 16/463,785.

* cited by examiner

FIG. 12

| Super-class | Class |
|---|---|
| Dangerous Obstacle | Fan |
| | Home Theater |
| | Multitap |
| | Lamp Base |
| | ⋮ |
| Non-Dangerous Obstacle | Step |
| | ⋮ |
| Movable Obstacle | Human Foot |
| | Human Arm |
| | Pet |
| | ⋮ |

FIG. 13

| Recognition Result | Confidence |
|---|---|
| Fan | 0.95 |
| Home Theater | 0.7 |

⇒ Fan (a)

| Recognition Result | Confidence |
|---|---|
| Fan | 0.35 |
| Home Theater | 0.4 |

⇒ Unknown data (b)

| Recognition Result | Confidence |
|---|---|
| Fan | 0.95 |
| Home Theater | 0.9 |

⇒ Dangerous Obstacle (c)

(a)　　　　　　　　(b)

FIG. 17
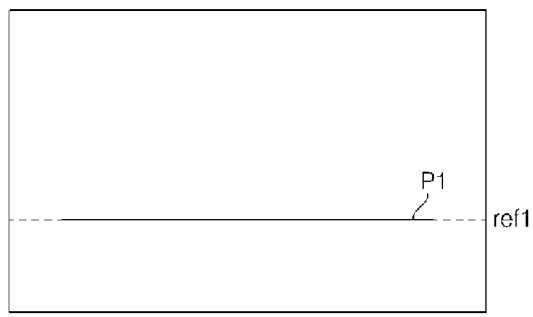
(a)
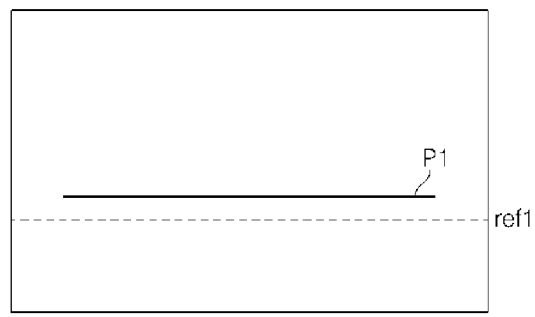
(b)
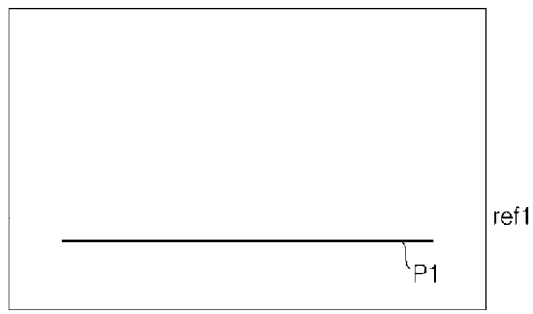
(c)
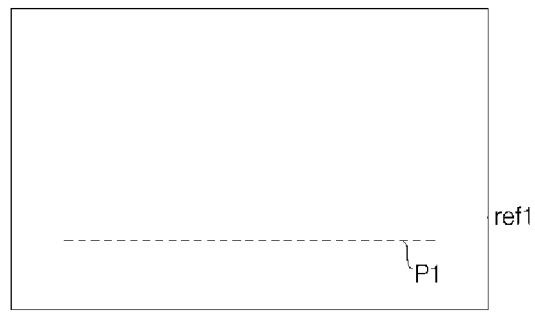
(d)
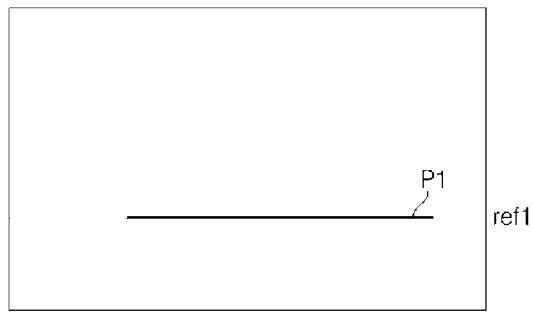
(d)

MOVING ROBOT AND CONTROL METHOD THEREOF

CROSS-REFERENCE TO RELATED APPLICATIONS

This application is a Continuation Application of U.S. patent application Ser. No. 16/463,785 filed May 23, 2019, which is a U.S. National Stage Application under 35 U.S.C. § 371 of PCT Application No. PCT/KR2017/013274, filed Nov. 21, 2017, which claims priority to Korean Patent Application No. 10-2016-0157552, filed Nov. 24, 2016, whose entire disclosures are hereby incorporated by reference.

BACKGROUND

1. Field

The present invention relates to a moving robot and a control method thereof, and more particularly, to a moving robot and a control method thereof, the moving robot which is able to recognize an obstacle, such as a movable obstacle, and performs avoidance driving.

2. Background

In general, robots have been developed for industrial use and taken charge of a part of factory automation. In recent years, robot application fields have been further expanded, and medical robots, aerospace robots, and the like have been developed, and household robots that can be used at homes have been also made. Among those robots, there is a moving robot which is capable of travelling autonomously.

A representative example of the household robot is a robot cleaner, which is a type of electronic device for sucking and cleaning surrounding dust and foreign substances while traveling a specific area by itself.

The moving robot is capable of freely moving by itself and performing avoidance driving using a plurality of sensors to avoid obstacles.

Generally, the moving robot utilizes an infrared sensor or an ultrasonic sensor to detect an obstacle. The infrared sensor determines the presence of the obstacle and a distance thereto based on an amount of light reflected from the obstacle and a time taken to receive the reflected light. The ultrasonic sensor emits ultrasonic waves, and, if there is an ultrasonic wave reflected by an obstacle, the ultrasonic sensor determines a distance to the obstacle based on a time difference between when the ultrasonic wave is emitted and when the reflected ultrasonic wave is received.

Meanwhile, recognition and avoidance of an obstacle greatly affect not just driving performance but also cleaning performance of the moving robot, and thus, it is required to secure a decent obstacle recognition confidence.

An existing technology (Korean Patent No. 10-0669892) discloses a technology for recognizing an obstacle at a high reliability by combining an infrared sensor and an ultrasonic sensor.

However, this existing technology (Korean Patent No. 10-0669892) cannot determine an attribute of an obstacle.

BRIEF DESCRIPTION OF THE DRAWINGS

The embodiments will be described in detail with reference to the following drawings in which like reference numerals refer to like elements wherein:

FIGS. 12 and 13 are diagrams for explaining obstacle recognition.

FIGS. 16 to 18 are diagrams for explaining operation of an obstacle detection sensor of the moving robot shown in FIG. 14.

DETAILED DESCRIPTION

Figure 1:
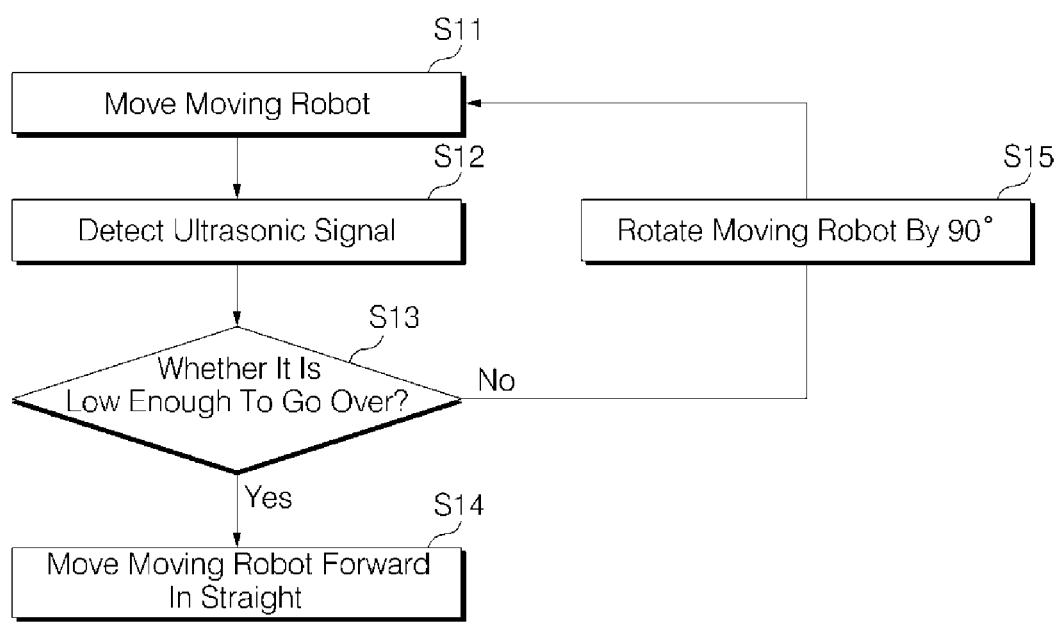
FIG. 1 is a diagram illustrating a method of detecting and avoiding an obstacle by an existing moving robot.

Hereinafter, exemplary embodiments according to the present disclosure will now be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted and, in order to more clearly describe the invention, thicknesses, areas, etc. of elements are enlarged or reduced and thus the thicknesses, areas, etc. of the elements are not limited to the drawings.

Meanwhile, the suffixes "module" and "part" of elements used in the description below are assigned or used only in consideration of the ease of writing the specification and do not have meanings or roles distinguished from each other and can be used exchangeable.

A moving robot 100 according to an embodiment of the present invention means a robot capable of moving by itself using a wheel or the like, and examples of the moving robot 100 may include an assistant robot and a cleaning robot. With reference to the drawings, a cleaning robot having a cleaning function will be described as an example of the moving robot 100. However, the present invention is not limited thereto.

Figure 2:
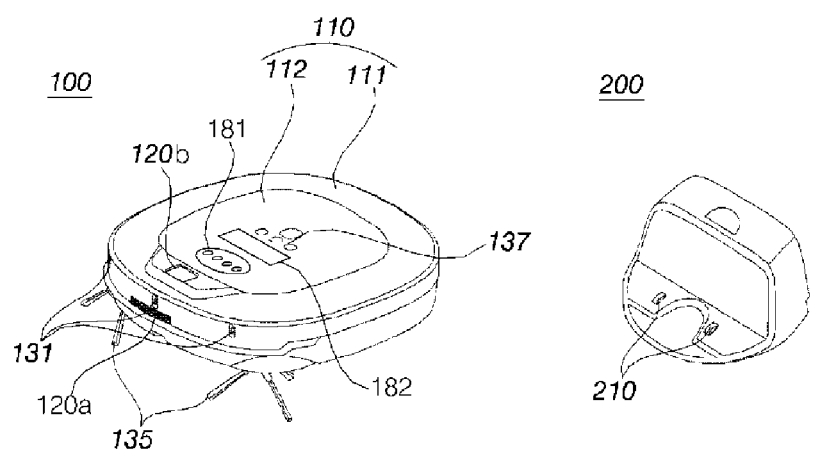
FIG. 2 is a perspective view of a moving robot and a charging base according to an embodiment of the present invention.

FIG. 2 is a perspective view of a moving robot and a charging base according to an embodiment of the present invention.

Figure 3:
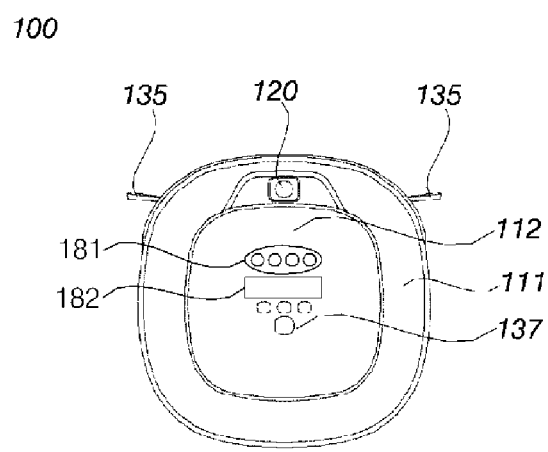
FIG. 3 is a diagram illustrating the top part of the moving robot shown in FIG. 2.
Figure 4:
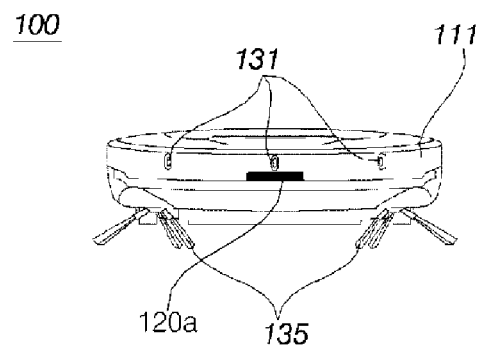
FIG. 4 illustrates the front part of the moving robot shown in FIG. 2.
Figure 5:
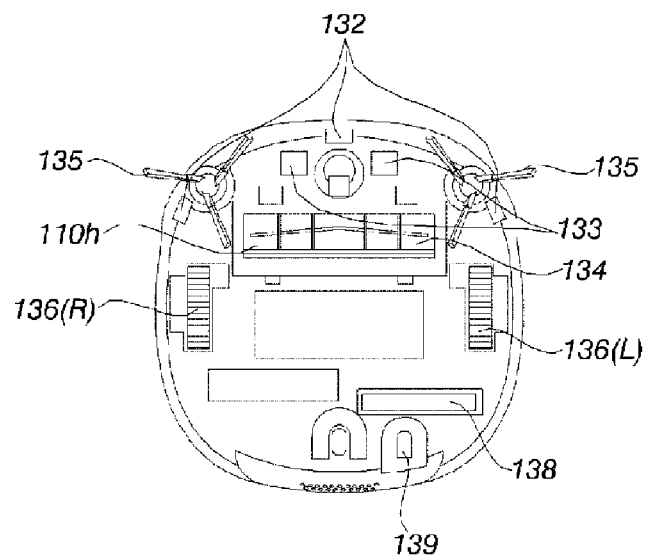
FIG. 5 illustrates the bottom part of the moving robot shown in FIG. 2.

FIG. 3 is a diagram illustrating the top part of the moving robot shown in FIG. 2, FIG. 4 illustrates the front part of the moving robot shown in FIG. 2, and FIG. 5 illustrates the bottom part of the moving robot shown in FIG. 2.

Figure 6:
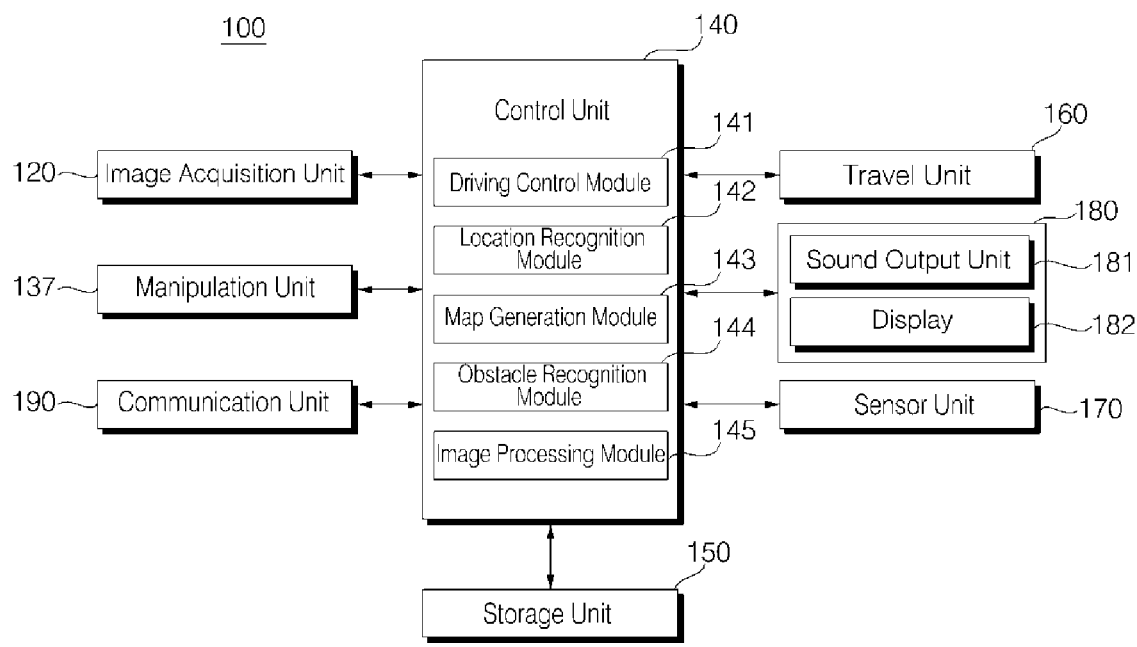
FIG. 6 is a block diagram illustrating a control relationship between main elements of a moving robot according to an embodiment of the present invention.

FIG. 6 is a block diagram illustrating a control relationship between main elements of a moving robot according to an embodiment of the present invention.

Referring to FIGS. 2 to 6, the moving robot 100 includes a body 110, and an image acquisition unit 120, 120a, and 120b for acquiring a surrounding image of the body 110.

Hereinafter, each part of the body 100 is defined in the following manner: a part of the body 110 toward the ceiling of a driving area is a top part (see FIG. 3); a part of the body 110 toward the bottom of the driving area is a bottom part (see FIG. 5); and a part defining the circumference of the body 110 between the top part and the bottom part is a front part (see FIG. 4).

The moving robot 100 includes a travel unit 160 which causes the body 110 to move. The travel unit 160 includes at least one driving wheel 136 which causes the body 110 to move. The travel unit 160 includes a driving motor (not shown) which is connected to the driving wheel 136 so as to rotate the driving wheel 136. The driving wheel 136 may be provided on both left and right sides of the body 110, and driving wheels 136 on the left and right sides of the body 110 are hereinafter referred to as a left wheel 136L and a right wheel 136R.

The left wheel 136L and the right wheel 136R may be driven by a single driving motor. In some embodiments, there may be provided a left driving motor for driving the left wheel 136L, and a right driving motor for driving the right wheel 136R, if necessary. By driving the left wheel 136L and the right wheel 136R at a different speed of rotation, it is possible to change a direction of travel of the body 110.

A suction unit 110h for suctioning air may be formed on the bottom part of the body 110. The body 110 may include: a suction port for providing suction force so that air can be suctioned through the suction port 110h; and a dust container (not shown) for storing dusts with the suctioned air.

The body 110 may include a case 111 which forms a space where various components of the moving robot 100 are accommodated. In the case 111, an opening for inserting and detaching the dust container may be formed and a dust container cover 112 for opening and covering the opening may be provided rotatably with respect to the case 111.

A roll-type main brush 134 having bristles exposed to the outside through the suction hole 110h, and auxiliary brushes 135 located at the front region of the bottom part of the body 110 and including bristles having a plurality of wings extended radially may be provided. Dust may be removed from the floor within the driving area by rotation of these brushes 134 and 135, and dust separated from the floor is sucked through the suction hole 110h and collected in the dust casing.

A battery 138 supplies power required for the overall operation of the moving robot 100 as well as a driving motor. When the battery 138 is discharged, the moving robot 100 may travel to return to a charging base 200 so as to recharge the battery 138. During such returning travel, the moving robot 100 may autonomously detect the position of the charging base 200.

The charging base 200 may include a signal transmitting unit (not shown) for transmitting a predetermined return signal. The return signal may be an ultrasonic signal or an infrared signal, but aspects of the present invention are not limited thereto.

The moving robot may include a signal detection unit (not shown) for receiving a return signal. The charging base 200 may transmit an infrared signal through the signal transmission unit, and the signal detection unit may include an infrared sensor which detects the infrared signal. The mobile robot 100 moves to a location of the charging base 200 in accordance with the infrared signal from the charging base 200, so that the mobile 100 is docked to the charging base 200. Due to such docking, charging is performed between a charging terminal 133 of the moving robot 100 and a charging terminal 210 of the charging base 200.

In some embodiments, the moving robot 100 may travel to return to the charging base 200 in an image-based manner or a laser-pattern extraction manner.

The moving robot 100 may recognize and extract a particular pattern formed in the charging base 200 by using an optical signal from the body 110, so that the moving robot 100 returns back to the charging base 200.

For example, the moving robot 100 according to an embodiment of the present invention may include a pattern optic sensor (not shown).

The pattern optic sensor may be provided in the body 110. The pattern optic sensor may irradiate an optical pattern onto a driving area of the moving robot 100 and capture an image of a region, onto which the optical pattern is irradiated, so as to acquire an input image. For example, the optical pattern may be a light having a specific pattern, such as a cross pattern.

Meanwhile, the charging base 200 may include two or more location marker spaced apart from each other at predetermined intervals.

A location marker makes a mark in a region to be distinguished from other regions, when an optical pattern is irradiated on a surface thereof. Such a maker is created because the optical pattern irradiated on the surface is deformed due to a morphological characteristic of the location marker or because the surface has a light reflectance value (or a light absorption value) different from other regions due to a material property of the location marker A location marker may include an edge that makes a mark formed. An optical pattern irradiated on the surface of the location marker is bent at an angle on the edge, so that a point can be found as the mark in an input image.

The moving robot 100 may automatically search for a base station when the battery is running out or when a charging command is received from a user.

When the moving robot 100 searches for a charging base, a pattern extraction unit extracts points from an input image, and a controller 140 acquires location information of the extracted points. Such location information may include locations on a three-dimensional (3D) space which is formed by taking into consideration of distance from the moving robot 100 to the points.

The controller 140 may calculate actual distance between the points between the acquired location information of the points, and compares the actual distance with a preset reference value. If a difference between the actual distance and the reference value falls within a predetermined range, it may be determined that the charging base 200 is found.

In addition, after acquiring a surrounding image using a camera of the image acquisition unit 120, the moving robot 100 may extract and identify a shape corresponding to the charging base 200 so as to return to the charging base 200.

In addition, the moving robot 100 may acquire a surrounding image using a camera of the image acquisition unit 120 and identifies a specific optical signal from the charging base 200 so as to return to the charging base 200.

The image acquisition unit 120 may include a camera module which captures an image of a driving area. The camera module may include a digital camera. The digital camera may include: at least one optical lens; an image sensor (e.g., a CMOS image sensor) including a plurality of photodiodes (e.g., pixels) in which an image is formed by a light passing the optical lens; and a Digital Signal Processor (DSP) forming an image based on signals output from the photodiodes. The DSP may generate a still image as well as a video which consists of frames consisting of still images.

It is desirable that the image acquisition unit 120 includes: a front camera 120a for acquiring a front image of the body 110; and an upper camera 120b provided on the top part of the body 110 to acquire an image of a ceiling of a driving area. However, a location and a capturing range of the image acquisition unit 120 are not limited thereto.

In this embodiment, cameras are installed on some portions (e.g., the front, rear, and bottom sides) of a moving robot, and continuously acquire images during cleaning. A plurality of such cameras may be installed at each portion for efficiency in capturing images. An image captured by a camera may be used to identify a type of substances, such as a dust, a hair, and a floor, existing in an area, to check whether cleaning has been done, or to determine a cleaning time.

The front camera 120a may capture an obstacle existing in front of the moving robot 100 in a direction of travel, or may capture a situation of a cleaning area.

According to an embodiment of the present invention, the image acquisition unit 120 may acquire a plurality of images by capturing the surroundings of the body 110, and the plurality of images may be stored in a storage unit 150.

The moving robot 100 may improve accuracy in recognition of an obstacle by using the plurality of images or by using efficient data which is one or more images selected from the plurality of images.

In addition, the moving robot 100 may include a sensor unit 170 including sensors which sense various types of data related to operation and a state of the moving robot 100.

For example, the sensor unit 170 may include an obstacle detection sensor 131 for detecting an obstacle in front of the moving robot 100. In addition, the sensor unit 170 may further include: a cliff detection sensor 132 for detecting whether a cliff exists in the floor of a driving area; and a button camera sensor 139 for acquiring an image of the floor.

Referring to FIGS. 2 to 4, the obstacle detection sensor 131 may include a plurality of sensors installed on an outer circumferential surface of the moving robot 100 at a predetermined interval.

For example, the sensor unit 170 may include a first sensor disposed on the front surface of the body 110, and second and third sensors spaced apart from the first sensor in the left and right directions.

The obstacle detection sensor 131 may include an infrared sensor, an ultrasonic sensor, an RF sensor, a terrestrial magnetism sensor, a Position Sensitive Device (PSD), etc.

Meanwhile, a location and a type of a sensor included in the obstacle detection sensor 131 may be different depending on a model of the moving robot 100, and the obstacle detection sensor 131 may include more various sensors.

The obstacle detection sensor 131 is a sensor which detects a distance to a wall or an obstacle, and the types of sensor in the present invention are not limited to the above examples. In the following, an ultrasonic sensor is described as an example of the obstacle detection sensor 131, and a different exemplary obstacle detection method will be described with reference to FIGS. 14 to 21.

The obstacle detection sensor 131 detects an object, especially an obstacle, exiting in a direction of travel of the moving robot 100, and transmits obstacle information to the controller 140. That is, the obstacle detection sensor 131 may detect a route of the moving robot 100, a protrusion existing in front of or on one side of the moving robot 100, a home appliance, furniture, a wall, a wall edge, etc., and transmit information about the detection to the control unit 140.

At this point, the controller 140 may detect a location of an obstacle based on at least two signals received from an ultrasonic sensor, and control movement of the moving robot 100 based on the detected location of the obstacle.

In some embodiments, the obstacle detection sensor 131 provided on the outer surface of the case 110 may include a transmitter and a receiver.

For example, an ultrasonic sensor may include at least one transmitter and at least two receivers crossing each other. Accordingly, the ultrasonic sensor may irradiate a signal in any direction and receive a signal, reflected from an obstacle, in any direction.

In some embodiments, a signal received by the obstacle detection sensor 131 may go through a signal processing procedure, such as amplification and filtering, and then the distance and direction to the obstacle may be calculated.

Meanwhile, the sensor unit 170 may further include an operation detection sensor, which detects operation of the moving robot 100 dependent upon driving of the body 110 and outputs operation information. For example, the operation detection sensor may be a gyro sensor, a wheel sensor, an acceleration sensor, etc.

When the moving robot 100 moves according to an operation mode, the gyro sensor senses a direction of rotation and detects an angle of rotation. The gyro sensor detects an angular velocity of the moving robot 100 and outputs a voltage value proportional to the angular velocity. Using the voltage value output from the gyro sensor, the control unit 140 calculates a direction of rotation and an angle of velocity.

The wheel sensor is connected to the left wheel 136L and the right wheel 136R to detect the number of rotation of a wheel. The wheel sensor may be a rotary encoder. The rotary encoder detects the number of rotation of each of the left wheel 136L and the right wheel 136R, and outputs information about the number of rotation.

The controller 140 may calculate a speed of rotation of each of the left wheel 136L and the right wheels 136R by using the number of times of rotation thereof. In addition, the controller 140 may calculate an angle of rotation by using a difference in the number of times of rotation between the left wheel 136L and the right wheel 136R.

The acceleration sensor detects a speed change of the moving robot 100, which is caused due to starting, stopping, changing direction, colliding with an obstacle. The acceleration sensor may be attached at a location adjacent to a main wheel or an auxiliary wheel so as to detect a slipping or idle state of a wheel.

In addition, the acceleration sensor may be embedded in the controller 140 to detect a speed change of the moving robot 100. That is, the acceleration sensor detects an impulse caused by a speed change, and outputs a voltage value corresponding to the detected impulse. Accordingly, the acceleration sensor may perform a function of an electronic bumper.

The controller 140 may calculate a location change of the moving robot 100 based on operation information output from the operation detection sensor. Such a location is a relative location which corresponds to an absolute location based on image information. Through such recognizing a relative location, it is possible to improve performance in recognizing a location based on image information and obstacle information.

Meanwhile, the moving robot 100 may include a power supply unit (not shown), which includes the chargeable battery 138 to supply power to a cleaning robot.

The power supply unit may supply a driving power and an operating power to each component of the moving robot 100, and may be charged with a charging current received from the charging base 200 when running out of power.

The moving robot 100 may further include a battery detection unit (not shown), which detects a charged state of the battery 138 and transmits a detection result to the controller 140. The battery 138 is connected to the battery detection unit, and transmits battery remaining amount and a battery charged state to the controller 140. The battery remaining amount may be displayed on a display 182 of an output unit 180.

In addition, the moving robot 100 includes a manipulation unit 137 through which on/off commands or various commands are able to be input. Through the manipulation unit 137, the moving robot 100 may receive various control commands required for overall operation of the moving robot 100.

In addition, the moving robot 100 may include the output unit 180 to display reservation information, a battery state, an operation mode, an operation state, an error state, etc., in the form of an image or sound.

The output unit 180 may include a sound output unit 181 which outputs an audio signal. Under the control of the controller 140, the sound output unit 181 may output a notification message, which indicates an alert sound an operation mode, an operation state, an error state, etc., in the form of sound. The sound output unit 181 may convert an electric signal from the controller 140 into an audio signal, and output the audio signal. To this end, the sound output unit 181 may include a speaker or the like.

In addition, the output unit 180 may further include the display 182, which displays reservation information, a battery state, an operation mode, an operation state, an error state, etc., in the form of an image.

Referring to FIG. 6, the moving robot 100 includes: the controller 140 for processing and making a determination as to various types of information, such as recognizing the current location of the moving robot 100; and the storage unit 150 for storing the various types of data. In addition, the moving robot 100 may further include a communication unit 190 for transmitting and receiving data with respect to an external terminal.

The external terminal may include an application for controlling the moving robot 100, display a map of an area which will be cleaned by the moving robot upon execution of the application, and designate a specific region on the map for cleaning. The external terminal may be, for example, a remote controller, a Personal Digital Assistance (PDA), a laptop, a smart phone, or a tablet in which an application for setting a map is installed.

Through communication with the moving robot 100, the external terminal may display the current location of the moving robot 100 along with a map, and information about a plurality of regions. In addition, the external terminal updates and displays the current location of the moving robot 100 during travelling of the moving robot 100.

The controller 140 controls overall operation of the moving robot 100 by controlling the image acquisition unit 120, the manipulation unit 137, and the travel unit 160 so as to.

The storage unit 150 is a device for storing various types of information required to control the moving robot 100, and may include a volatile or non-volatile recording medium. A recording medium stores data able to be read by a microprocessor, and may include a Hard Disk Drive (HDD), a Solid State Disk (SDD), a Silicon Disk Drive (SDD), a ROM, a RAM, a CD-ROM, a magnet tape, a floppy disk, and an optical data storage device.

In addition, a map of a driving area may be stored in the storage unit 150. The map may be received from an external or a server which is able to exchange information through wired or wireless communication with the moving robot 100, or may be generated by the moving robot 100.

Locations of rooms in the driving area may be displayed on the map. In addition, the current location of the moving robot 100 may be disposed on the map, and the current location of the moving robot 100 on the map may be updated during travelling of the moving robot 100. The external terminal stores a map identical to a map stored in the storage unit 150.

The storage unit 150 may store cleaning history information. The cleaning history information may be generated each cleaning.

A map of a driving area stored in the storage unit 150 may be a navigation map used for driving during cleaning, a Simultaneous Localization And Mapping (SLAM) map used for location recognition, a learning map which is stored and learned upon collision with an obstacle and which is used for cleaning, a global localization map used for global localization recognition, and an obstacle recognition map which stores information about a recognized obstacle.

Meanwhile, maps stored in the storage unit 150 may be classified and managed on the basis of usage, as described above, but the usage of each map may not be distinguished clearly. For example, a plurality of information items may be stored in one map so that the map can be used for at least two purposes. For example, information about a recognized obstacle may be recorded in a learning map to replace obstacle recognition map, and the SLAM map for location recognition may be used to replace the global localization map or may be used together with the global localization map.

The controller 140 may include a driving control module 141, a location recognition module 142, a map generation module 143, and an obstacle recognition module 144.

Referring to FIGS. 2 to 6, the driving control module 141 is configured to control driving of the moving robot 100, and controls driving of the travel unit 160 based on driving settings. In addition, the driving control module 141 may figure out a driving path of the moving robot 100 based on operation of the travel unit 160. For example, the driving control module 141 may figure out the current or previous speed and a distance of travel of the moving robot 100 based on rotation speed of the driving wheel 136, and the driving control module 141 may figure out even the current or previous process of transition of direction based on a direction of travel of each driving wheel 136L or 136R. Based on driving information of the moving robot 100 acquired as above, a location of the moving robot 100 may be updated on a map.

The map generation module 143 may generate a map of a driving area. The map generation module 143 may process an image acquired through the image acquisition unit 120 so as to generate a map. That is, it is possible to generate a cleaning map corresponding to a cleaning area.

In addition, the map generation module 143 may process an image acquired from each location through the image acquisition unit 120 and associate the image with a map so as to recognize the pose of the moving robot 100.

The location recognition module 142 estimates and recognizes the current location of the moving robot 100. The location recognition module 142 recognizes a location of the moving robot 100 based on image information of the image acquisition unit 120, and thus, even when the location of the moving robot 100 is changed all of sudden, the location recognition module 142 may be able to estimate and recognize the current location of the moving robot 100.

Using the location recognition module 142, the moving robot 100 is able to recognize its location during continuous travelling. Using the map generation module 143 and the obstacle recognition module 144 without the location recognition module 142, the moving robot 100 is able to learn a map and estimate the current location of the moving robot 100.

During travelling of the moving robot 100, the image acquisition unit 120 acquires surrounding images of the moving robot 100. Hereinafter, the images acquired by the image acquisition unit 120 are defined as "acquisition images."

An acquisition image includes various features, such as a lighting device on the ceiling, an edge, a corner, a blob, and a ridge.

The map generation module 143 detects a feature from each of the acquisition images. In computer vision technologies, there are well-known feature detection methods for detecting a feature from an image. There are well-known feature detectors suitable for detecting such features. For example, such feature detectors include Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, Grey-level blobs detectors.

The map generation module 143 calculates a descriptor based on each feature. The map generation module 143 may convert a feature into a descriptor using a Scale Invariant Feature Transform (SIFT) method for feature detection.

Meanwhile, a descriptor is defined as a group of individual features existing in a specific space, and may be expressed in the form of a n-th dimensional vector. For example, various features, such as an edge, a corner, a blob, and a ridge in the ceiling, are calculated into respective descriptors and stored in the storage unit 150.

Based on descriptor information acquired through an acquisition image of each location, at least one descriptor for each acquisition image is classified into a plurality of groups according to a predetermined sub-classification rule, and descriptors belonging to the same group may be converted into sub-representative descriptors according to a predetermined sub-representative rule. That is, there may be required a process in which representative values are designated for descriptors acquired from each individual image and then standardized.

The SIFT method makes it possible to detect a feature which is invariable despite of a change in scale, rotation, and brightness of an imaging object, and thus, the SIFT method enables detection of a (rotation-invariant) feature which is invariable even when the moving robot 100 images the same area in different positions. However, aspects of the present invention are not limited thereto, and other various techniques (e.g., Histogram of Oriented Gradient (HOG), Haar feature, Fems, Local Binary Pattern (LBP), Modified Census Transform (MCT)) may be applied.

Based on descriptor information acquired from an acquisition image of each location, the map generation module 143 may classify at least one descriptor of each acquisition image into a plurality of groups according to the predetermined sub-classification rule. The, the map generation module 143 may convert descriptors belonging to the same group into respective sub-representative descriptors according to a predetermined sub-representative rule.

In another example, the map generation module 143 may classify descriptors, collected from acquisition images of a specific area such as a room, into a plurality of groups according to a predetermined sub-classification rule, and may convert descriptors belonging to the same group into respective representative descriptors according to the predetermined sub-representative rule.

In doing so, the map generation module 143 may obtain feature distribution at each location. The feature location at each location may be expressed as a histogram or a n-th dimensional vector. In another example, without using a predetermined sub-classification rule and a predetermined sub-representative rule, the map generation module 143 may estimate an unknown current location based on a descriptor calculated from each feature.

In addition, when the current location of the moving robot 100 is rendered unknown due to location hopping or the like, it is possible to estimate the current location of the moving robot 100 based on data such as a pre-stored descriptor or a sub-representative descriptor.

The moving robot 100 may acquire an acquisition image acquired by the image acquisition unit 120 from the unknown current location. Using the image, various features are found including lighting devices, an edge, a corner, a blob, and a ridge in the ceiling.

The location recognition module 142 detects features from an acquisition image. Various methods for detecting a feature from an image in computer vision technologies, and various feature detection devices suitable for detecting features are the same as described above.

The location recognition module 142 calculates a recognition descriptor based on each recognition feature in a recognition descriptor calculation procedure. The recognition feature and the recognition descriptor describe a procedure performed by the location recognition module 142, and they are used to be distinguished from a procedure performed by the map generation module 143. However, these terms are used simply to define features in the outside of the moving robot 100 with different expressions.

For feature detection, the location recognition module 143 may convert a recognition feature into a recognition descriptor using the SIFT method. The recognition descriptor may be expressed as a n-th dimensional vector.

The SIFT method is an image recognition method for selecting a feature easy to distinguish, such as a corner, from an acquisition image, and calculating a n-th dimensional vector which is a relevant-dimensional numeric value that indicates a feature of distribution of brightness gradients of pixels in a predetermined area nearby each feature point (that is, a direction in which brightness changes and a degree of the change).

The location recognition module 142 converts at least one recognition descriptor information, acquired from an acquisition image of an unknown current location, into location information (e.g., feature distribution at each location) subject to comparison and comparable location (e.g., sub-recognition feature distribution) according to a predetermined sub-conversion rule.

A similarity level of each level may be calculated by comparing feature distribution at each location with recognition feature distribution at each location according to a predetermined sub-comparison rule. A similarity level (probability) is calculated for each location, and a location having the highest probability may be determined as the current location.

As such, the controller 140 may generate a map in which a driving area is defined and which is divided into a plurality of areas, or may recognize the current location of the body 110 based on a pre-stored map.

When a map is generated, the controller 140 may transmit the generated map to an external terminal, a server, and the like through the communication unit 190. In addition, as described above, the controller 140 may store a map when the map is received from an external terminal, a server, and the like.

In addition, when a map is updated during travelling, the controller 140 may transmit updated information to an external terminal so that the same map is stored in the external terminal and the moving robot 100. As the external terminal and the moving robot 100 are managed to store the same map, the moving robot 100 is able to clean a designated area upon a cleaning command from the external terminal and the external terminal may transmit the current location of the moving robot 100.

At this point, the map may divide a cleaning area into a plurality of regions, include a channel connecting the plurality of regions to one another, and store information about an obstacle within the cleaning area.

When a cleaning command is input, the controller 140 may determine whether the current location of the moving robot 100 coincides with a location shown on the map. The cleaning command may be input from a remote control, a manipulation unit, or an external terminal.

When the current location of the moving robot 100 does not coincide with a location shown on the map or when it is not possible to check the current location of the moving robot 100, the controller 140 may recognize the current location and restore the current location of the moving robot 100 and then control the travel unit so that the moving robot 100 moves to a designated region based on the current location.

When the current location of the moving robot 100 does not coincide with a location shown in the map or when it is not possible to check the current location of the moving robot 100, the location recognition module 142 may estimate the current location of the moving robot 100 based on the map by analyzing an acquisition image received from the image acquisition unit 120. In addition, the obstacle recognition module 144 or the map generation module 143 may recognize the current location of the moving robot 100 in the same manner as well.

After recognizing the current location and restoring the current location of the moving robot 100, the driving control module 141 may calculate a drive path from the current location to a designation region, and control the travel unit 160 to move to the designation area.

When cleaning pattern information is received from a server, the driving control module 141 may divide the entire driving area into a plurality of regions based on the received cleaning pattern information, and set at least one region as a designation region.

In addition, the driving control module 141 may calculate a drive path based on the received cleaning pattern information, and perform cleaning by travelling along the drive path.

When cleaning of the set designated region is complete, the controller 140 may store cleaning records in the storage unit 150.

In addition, the controller 140 may transmit an operation state or a cleaning state of the moving robot 100 at a predetermined interval to an external terminal or a server through the communication unit 190.

Accordingly, based on received data, the external terminal displays a location of the moving robot 100, together with a map, on the screen of an application being executed, and outputs information about the cleaning state.

The moving robot 100 according to an embodiment of the present invention may move in one direction until an obstacle or a wall is detected. Once the obstacle recognition module 144 recognizes an obstacle, the moving robot 100 may determine a driving pattern, such as travelling in straight or rotation, depending on an attribute of the recognized obstacle.

For example, if the attribute of the recognized obstacle indicates an obstacle which the moving robot 100 is able to go over, the moving robot 100 may keep travelling in straight. Alternatively, if the attribute of the recognized obstacle indicates an obstacle which the moving robot 100 is unable to go over, the moving robot 100 may travel in a zigzag pattern by rotating, travelling a predetermined distance, and then travelling again in a direction opposite to the original moving direction until any obstacle is detected.

Meanwhile, if the attribute of the recognized obstacle indicate a movable obstacle such as a person and a pet, the controller 140 may perform a control operation so that the sound output unit 181 outputs preset sound.

The preset sound may be alert sound or a message for guiding the movable obstacle to move.

For example, when at least part of a human body, such as a foot and a hand is recognized, the controller 140 may control the sound output unit 181 to output a message for guiding the person to step aside.

In addition, when a pet such as a dog and a cat is recognized, the controller 140 may control the sound output unit 181 to output alert sound so that the pet moves in response to the sound.

Meanwhile, when the attribute of the recognized obstacle indicates a movable obstacle, the controller 140 may control the travel unit 160 so that the body 110 stops being moved.

In addition, the controller 140 may output alert sound or a message for guiding the movable obstacle to move, and wait for a particular standby time until the movable obstacle moves.

In the case where the recognized obstacle is a movable obstacle, the controller 140 may control the moving robot 100 to travel in different ways depending on whether the movable obstacle has moved after the particular standby time.

In this case, when movement of the movable obstacle is detected for the particular standby time, the controller 140 may perform a control operation so that the previous travel movement is resumed.

That is, if the movable obstacle moves within the particular standby time, a constraint to movement of the moving robot 100 is eliminated, and thus, it is possible to resume movement in the previous travelling pattern.

If movement of the movable obstacle is not detected within the particular standby time, the controller 140 may perform avoidance driving to avoid the movable obstacle.

That is, if the movable obstacle does not move within the particular standby time, the moving robot may perform avoidance driving with respect to the obstacle.

Meanwhile, the controller 140 may perform a control operation so that the body 100 moves forward and backward repeatedly within a predetermined distance range.

It is desirable that the controller 140 may perform a control operation so that the body 110 travels forward and backward repeatedly, as if it gets startled, within the predetermined distance range for a particular standby time until the movable obstacle moves. Accordingly, by the startled movement of the moving robot 100 as well as a message, a user may intuitively notice that the moving robot 100 waits for the user's movement.

Meanwhile, based on an attribute of a recognized obstacle, the controller 140 may perform a control operation so that the avoidance driving is performed in a different pattern. Depending on an attribute of an obstacle, such as a non-dangerous obstacle (normal obstacle), a dangerous obstacle, a movable obstacle, and the like, the controller 140 may perform a control operation that avoidance driving is performed in a different pattern.

For example, the control unit 140 may perform a control operation so that the moving robot 100 makes a detour with a greater safe distance from a dangerous obstacle so as to travel by detouring around the dangerous obstacle.

In addition, if a movable obstacle does not move even after a particular standby time, the controller 140 may perform avoidance driving with respect to a normal obstacle or avoidance driving with respect to a dangerous obstacle. In addition, if an avoidance driving pattern with respect to a movable obstacle is set, the controller 140 may perform a control operation that the moving robot 100 travels in the avoidance driving pattern.

The moving robot 100 according to an embodiment of the present invention may perform obstacle recognition and avoidance driving based on machine learning.

The controller 140 may include: an obstacle recognition module 144 which recognizes an obstacle, which is pre-learned using machine learning, from an input image; and a driving control module 141 which controls driving of the travel unit 160 based on an attribute of the recognized obstacle.

The moving robot according to an embodiment of the present invention may include the obstacle recognition module 144 which has pre-learned obstacle attributes using machine learning.

Machine learning is a technique by which a computer can learn data without a logic indicated by a person so that the computer is able to solve a problem by itself based on the data.

Deep learning is a method of teaching a computer a human thinking way based on Artificial Neural Networks (ANN) as an attempt to configure artificial intelligence. That is, deep learning is an artificial intelligence technique by which a computer can learn on its own without a human's help.

The ANN may be implemented as software or as hardware such as a chip.

The obstacle recognition module 144 may include a software- or hardware-type ANN which has learned obstacle attributes.

For example, the obstacle recognition module 144 may include Deep Neural Network (DNN), such as Convolutional Neural Network (CNN), Recurrent Neural Network (RNN), and Deep Belief Network (DBN), which are trained using deep learning.

Deep Learning will be described in more detail with reference to FIGS. 9 to 11.

The obstacle recognition module 144 may determine an attribute of an obstacle included in input image data, based on weights between nodes included in the DNN.

Meanwhile, if the sensor unit 170 detects an obstacle during travelling of the moving robot 100, the controller 140 may perform a control operation so as to extract a partial region from an image acquired by the image acquisition unit 120 in a direction from which the obstacle is detected by the sensor 170.

The image acquisition unit 120, especially the front camera 120a, may acquire an image within a predetermined angle range in a moving direction of the moving robot 100.

The controller 140 may detect an attribute of an obstacle existing in a moving direction of the moving robot 100, not by using the entire image acquired by the image acquisition unit 120, especially the front camera 120a, but by using only a partial region of the image.

Referring to FIG. 6, the controller 140 may further include an image processing module 145 which extracts a partial region from an image, acquired by the image acquisition unit 120, in a direction from which an obstacle is detected by the sensor unit 170.

In another example, the moving robot 100 may further include an additional image processing unit which extracts a partial region from an image acquired by the image acquisition unit 120 in a direction from which an obstacle is detected by the sensor unit 170. In yet another example, the image acquisition unit 120 may process an image on its own.

Due to its characteristics, the obstacle recognition module 144 which is trained using the machine learning has a high recognition rate if a learned subject accounts for a greater portion of input image data.

Thus, the present invention may improve the recognition rate of the obstacle recognition module 144 by extracting a different region from an image acquired by the image acquisition unit 120 according to a direction from which an obstacle is detected by the sensor unit 170, such as an ultrasonic sensor.

The obstacle recognition module 144 may recognize an obstacle based on data that is pre-learned using machine learning from an image acquired by the image acquisition unit 120.

It is more desirable that the obstacle recognition module 144 may recognize an obstacle based on data which is pre-learned by machine learning from an image extracted from an image acquired by the image acquisition unit 120.

Meanwhile, the driving control module 141 may control driving of the travel unit 160 based on an attribute of the recognized obstacle.

Meanwhile, when the obstacle is detected from the forward right side of the body 110, the controller 140 may extract a lower right region of an image acquired by the image acquisition unit 120. When the obstacle is detected from the forward left side of the body 110, the controller 140 may extract a lower left region of an image acquired by the image acquisition unit 120. When the obstacle is detected from the front side of the body 110, the controller 140 may extract a lower center region of an image acquired by the image acquisition unit 120.

In addition, the controller 140 may perform a control operation so as to shift and extract a target region from an image, acquired by the image acquisition unit 12, in a direction from which the obstacle is detected.

Cropping a partial region from an image acquired by the image acquisition unit 120 will be described in detail with reference to FIGS. 27 to 30.

In addition, when the sensor unit 170 detects an obstacle during travelling of the moving robot 100, the controller 140 may perform a control operation based on a moving direction and a speed of the body 110 so that an image captured at a specific time before detection of the obstacle by the sensor unit 170 is selected from a plurality of continuous images acquired by the image acquisition unit 120.

If the image acquisition unit 120 acquires an image by using the obstacle detection time of the sensor unit 170 as a trigger signal, the obstacle may not be included in the acquired image or may be displayed small in the acquired image because the moving robot 100 is still moving.

Thus, in an embodiment of the present invention, an image captured at a specific time before the obstacle detection time of the sensor unit 170 may be selected from a plurality of continuous images acquired by the image acquisition unit based on the moving direction and the speed of the body 110, and the selected image may be used as data used for obstacle recognition.

Selecting an image captured at a specific time from images acquired by the image acquisition unit 120, and using the selected image as data for obstacle recognition will be described in detail with reference to FIGS. 31 and 32.

Meanwhile, the obstacle recognition module 144 may recognize an attribute of an obstacle included in the selected image of the specific time based on data that is pre-learned using machine learning.

Meanwhile, the storage unit 150 may store input data for determination of an attribute of an obstacle, and data for train the DNN.

The storage unit 150 may store an original image acquired by the image acquisition unit 120, and extracted images of extracted partial regions.

In addition, in some embodiments, the storage unit 150 may store a weight and a bias which form the DNN structure.

In addition, in some embodiments, the weight and the bias which form the DNN structure may be stored in an embedded memory of the obstacle recognition module 144.

Meanwhile, the obstacle recognition module 144 may perform a learning process by using a specific image as training data whenever the image acquisition unit 120 acquires an image or extracts a partial region from the image, or may perform a learning process after a specific number of images is acquired.

That is, the obstacle recognition module 144 may update of the DNN structure such as a weight by adding a recognition result whenever an obstacle is recognized, or by securing a specific number of training data and then performing a learning process using the secured training data.

Alternatively, the moving robot 100 may receive machine learning-related data from a specific server through the communication unit 190.

In this case, the moving robot 100 may update the obstacle recognition module 141 based on machine learning-related data received from the specific server.

Meanwhile, the moving robot 100 may transmit an image, acquired or extracted by the image acquisition unit 120, to the specific server through the communication unit 190.

Figure 7:
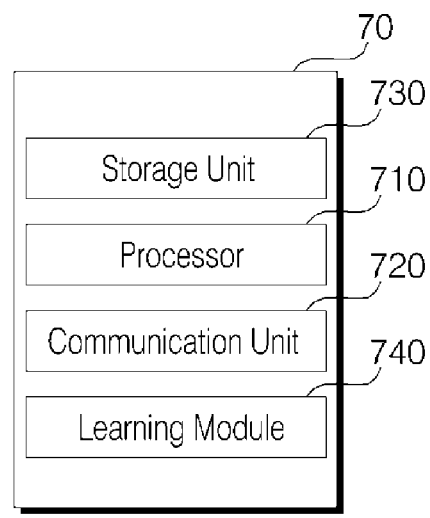
FIG. 7 is a schematic block diagram illustrating a server according to an embodiment of the present invention.

FIG. 7 is a schematic block diagram illustrating a server according to an embodiment of the present invention.

Referring to FIG. 7, a server 70 may include a communication unit 720, a storage unit 730, a learning module 740, and a processor 710.

The processor 710 may control overall operation of the server 70.

Meanwhile, the server 70 may be a server run by a home appliance manufacturer such as a manufacturer of the moving robot 100, a server run by a service provider, or a cloud server.

The communication unit 720 may receive various types of data, such as state information, operation information, and manipulation information, from a gate way or a home appliance, such as a mobile terminal and a moving robot 100.

The communication unit 720 may transmit data corresponding to various types of received information to a gateway or a home appliance, such as a mobile terminal and the moving robot 100.

To this end, the communication unit 720 may include one or more communication modules, such as an Internet module and a mobile communication module.

The storage unit 730 may store received information and corresponding data required to generate result information.

In addition, the storage unit 730 may store data used for machine learning, and result data.

The learning module 740 may act as a learning device of a home appliance such as the moving robot 100.

The learning module 740 may include DDN, such as CNN, RNN, and DBN, and may train the DNN.

As a learning method by the learning module 740, unsupervised learning and supervised learning may be both used.

Meanwhile, depending on settings, the controller 810 may perform a learning process and then update an ANN structure of a home appliance, such as the moving robot 100, with a learned ANN structure after.

Figure 8:
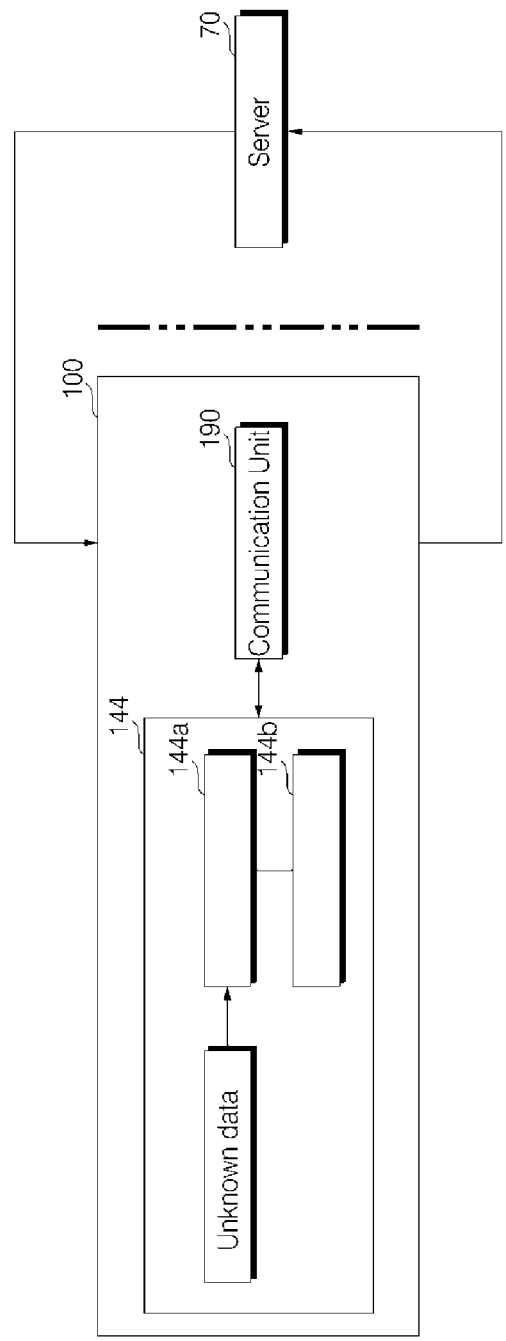
FIG. 8 is a diagram illustrating an operation method of a moving robot and a server according to an embodiment of the present invention.

FIG. 8 is a diagram illustrating an operation method of a moving robot and a server according to an embodiment of the present invention.

Referring to FIG. 8, the controller 140 of the moving robot 100, especially the obstacle recognition module 144, may be embedded with a DNN structure 144a such as a CNN.

A pre-learned DNN structure 144a may receive recognition input data, recognize an obstacle's attribute included in the input data, and output a result.

Unknown data which the DNN structure 144a is unable to recognize may be stored in the storage unit 150 or in a storage space 144b of the obstacle recognition module 144.

Meanwhile, unknown data which the obstacle recognition module 144 is unable to recognize may be transmitted to the server 70 through the communication unit 190. In addition, even data recognized by the obstacle recognition module 144 may be transmitted to the server 70.

The server 70 may generate a configuration of learned weights, and the server 70 may train the DNN structure using training data.

The server 70 may train the DNN based on received data, and transmit updated DNN structure data to the moving robot 100 so as to update the DNN structure.

Figure 9:
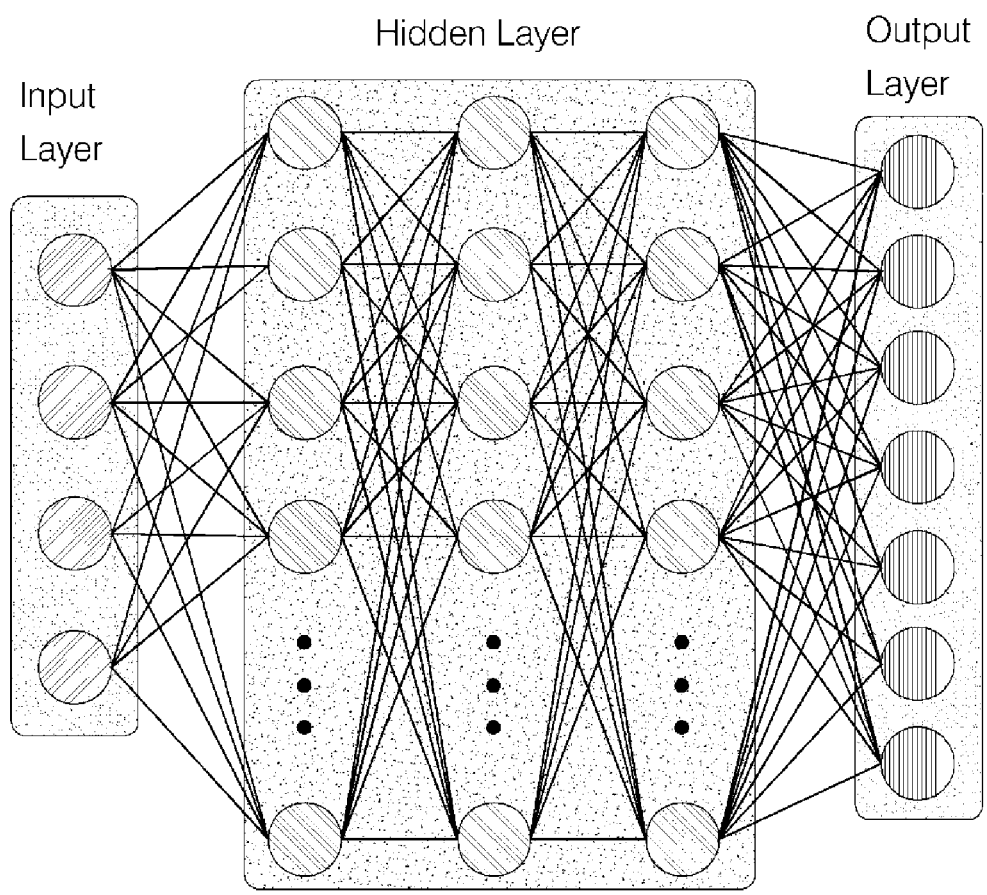
FIGS. 9 to 11 are diagram for explaining deep learning.
Figure 10:
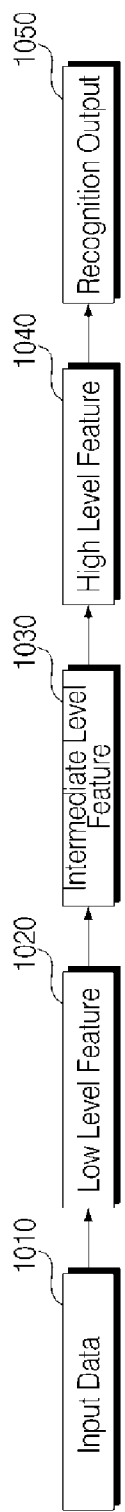
Figure 11:
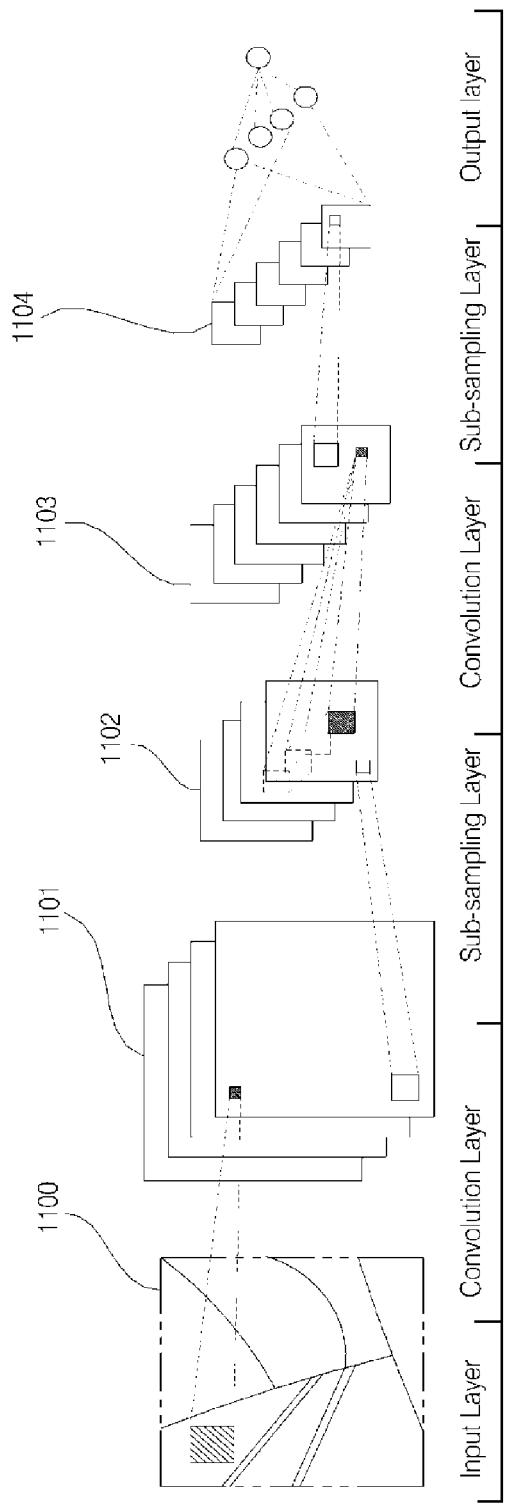

FIGS. 9 to 11 are diagram for explaining deep learning.

Deep learning, which is a kind of machine learning, is a method of learning data deep in multiple levels.

Deep learning may represent a set of machine learning algorithms which extract key data is extracted from a plurality of datasets as a higher level is set.

A deep learning structure may include ANN, and may be configured as DNN, such as CNN, RNN, and DNB.

Referring to FIG. 9, the ANN may include an input layer, a hidden layer, and an output layer. Each layer includes a plurality of nodes, and each layer is connected to a next layer. Nodes between adjacent layers may be connected to each other with a weight.

Referring to FIG. 10, a computer (machine) may generate a feature map by discovering a specific pattern from input data 1010. The computer (machine) may extract a low level feature 1020, an intermediate level feature 1030, and a high level feature 1040, recognize a subject, and output a result 1050.

The ANN may be configured such that a further next layer is abstracted as a higher level feature.

Referring to FIGS. 9 and 10, each node may operate based on an activation model, and an output value corresponding to an input value may be determined by the activation model.

A random node, e.g., an output value of the lower level feature 1020, may be input to a next layer connected to the random layer, e.g., a node of the intermediate level feature 1030. A node of the next layer, e.g., the node of the intermediate level feature 1030, may receive values output from a plurality of nodes of the lower level feature 1020.

At this point, an input value to each node may be a value obtained by applying a weight to a value output from a previous layer. A weight may indicate strength of connection between nodes.

In addition, a deep learning procedure may be considered to be a procedure for discovering an appropriate weight.

Meanwhile, a value output from a random node, e.g, the intermediate level feature 1030, may be input to a next layer connected to the random node, e.g., a node of the high level feature 1040. A node of the next layer, e.g., a node of the high level feature 1040, may receive values output from a plurality of nodes of the intermediate level feature 1030.

The ANN may extract feature information corresponding to each level by using a learned layer corresponding to each level. The ANN may abstract layers sequentially, and recognize a specific subject by using the highest level feature information.

For example, in a process of face recognition based on deep learning, a computer may distinguish bright pixels and dark pixels from an input image according to brightness of pixels, distinguish a simple shape, such as a boundary and an edge, and then distinguish a more complicated shape or object. Lastly, the computer may identify a shape that defines a human face.

A deep learning structure according to the present invention may utilize various structures. For example, the deep learning structure according to the present invention may be CNN, RNN, and DBN.

The RNN is often used to process natural languages and efficient in processing time-series data which changes over time. The RNN adds up a layer each time to configure an ANN structure.

The DBN is a deep learning structure configured with multiple layers of Restricted Boltzman Machine (RBM) which is a deep learning technique. If a predetermined number of layers is built up by repeatedly performing RBM learning, the DBN having the predetermined number of layers may be configured.

The CNN is commonly used in object recognition fields and will be described with reference to FIG. 11.

The CNN is a model that imitates a human brain functions in the assumption that a person extracts basic features of an object, goes through complicated calculations in his brain, and recognizes the object based on the calculation result.

FIG. 11 is a diagram illustrating a CNN structure.

The CNN may include an input layer, a hidden layer, and an output layer.

A specific image 1100 may be input into the input layer.

Referring to FIG. 11, the hidden layer may be composed of a plurality of layers, and include a convolution layer and a sub-sampling layer.

The CNN basically uses various filters for extracting features from an image through convolution computation, and a pooling or non-linear activation function for adding a non-linear feature.

Convolution is used mainly for filter computation in image processing fields in order to implement a filter which extracts a feature from an image.

For example, if convolution computation is repeatedly performed on the entire image by moving a 3×3 window, it is possible to obtain an appropriate result depending on a weight of the window.

The convolution layer may be used for convolution filtering to filter out information extracted from a previous layer with a predetermined-sized filter.

The convolution layer performs convolution computation on image data 1100 and 1102 received using a convolution filter, and generates feature maps 1101 and 1103 which presets features of the input image 1100.

As a convolution filtering result, filtering images whose number corresponds to the number of filters included in the convolution layer may be generated. The convolution layer may be composed of nodes included in the filtering images.

In addition, the sub-sampling layer paired with the convolution layer may include feature maps whose number is identical to the number of convolution layers.

The sub-sampling layer may reduce the dimension of the feature maps 1101 and 1103 through sampling or pooling.

The output layer recognizes the input image 1100 by combining various features presented on the feature map 1104.

An obstacle recognition module of a moving robot according to the present invention may utilize various deep learning structures. For example, the obstacle recognition module may utilize a CNN structure which is commonly used for recognition of an object within an image, but aspects of the present invention are not limited thereto.

Meanwhile, the ANN's learning may be performed by adjusting a weight of a connection line between nodes so as to output a desired output in response to a given input. In addition, the ANN may constantly update a weight value through learning. In addition, back propagation may be used to train the ANN.

FIGS. 12 and 13 are diagrams for explaining obstacle recognition.

Referring to FIG. 12, the obstacle recognition module 144 may classify obstacles into classes, such as a fan, a home theater, a multitap, a lamp base, a step, a person (foot) a person (hand), and a pet, and recognize the obstacles based on the classes.

In addition, the obstacle recognition module 144 may classify the fan, the home theater, the multitap, and the lamp base as high-level dangerous obstacle super classes, and recognize them with such classes.

In addition, the obstacle recognition module may classify an obstacle, such as a step, which the moving robot 100 is able to travel forward in straight, as a non-dangerous obstacle super class, and recognize it with such a class.

In addition, the obstacle recognition module 144 may classify a human (foot), a human (hand), and the pet as a movable obstacle super class, and recognize them with such a class.

Referring to (a) of FIG. 13, the obstacle recognition module 144 may recognize an input image and obtain recognition results indicating that the fan has a confidence of 0.95 and the home theater has a confidence of 0.7. In this case, as a result of recognition of the input image, the obstacle recognition module 144 may output the fan which has a higher confidence.

Meanwhile, a confidence may be normalized to a range of 0.0 to 1.0.

Referring to (b) of FIG. 13, the obstacle recognition module 144 may recognize an input image and obtain recognition results indicating that the fan has a confidence of 0.35 and the home theater has a confidence of 0.4.

For example, if it is set to ignore a confidence of 0.6 or less, the above two confidence are less than the reference value, and thus, the obstacle recognition module 144 may not select any of the two recognition results and determine that an object is unknown data.

Referring to (c) of FIG. 13, the obstacle recognition module 144 may recognize an input image and obtain recognition results indicating that the fan has a confidence of 0.95 and the home theater has a confidence of 0.9.

For example, if it is set to select a recognition result with a confidence of 0.9 or greater as a final recognition result, the above two recognition results has confidence greater than the reference value, and thus, the obstacle recognition module 144 may determine that the obstacles are higher-level dangerous obstacles without selecting any one of the recognition results.

Alternatively, if it is set to accept a recognition result having a higher confidence when a difference between confidences is 0.15 or greater, the obstacle recognition module 144 may determine that the obstacle is a higher-level dangerous obstacle.

Meanwhile, even when an obstacle is determined to be a dangerous obstacle, the driving control module 141 may control the driving unit 160 to move by detouring around the dangerous obstacle.

Figure 14:
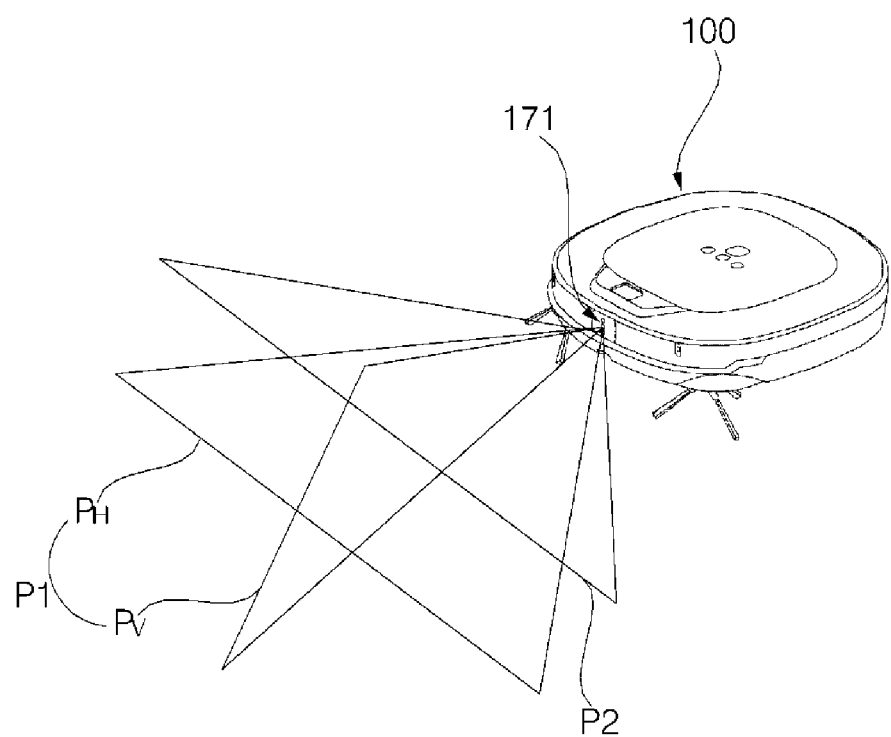
FIG. 14 is a perspective view of a moving robot according to an embodiment of the present invention.

FIG. 14 is a perspective view of a moving robot according to an embodiment of the present invention.

Figure 15:
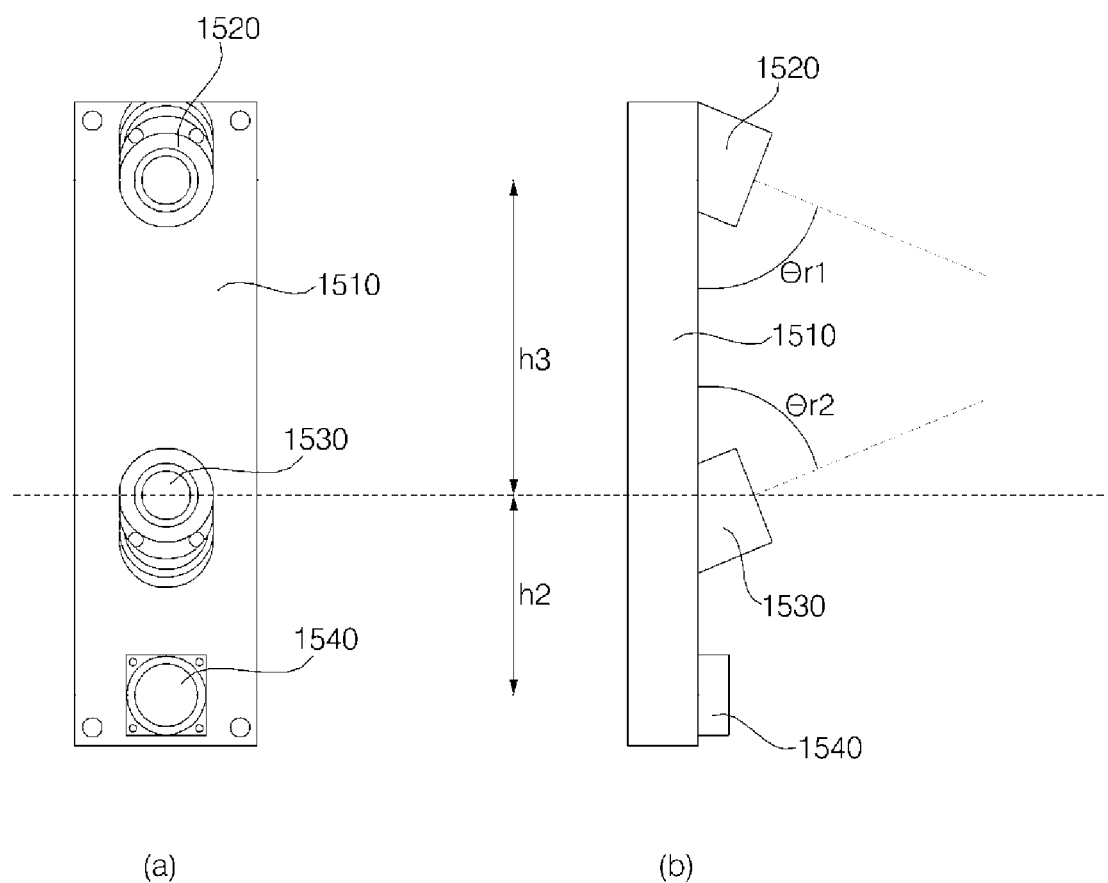
FIG. 15 is a front view and a side view of an obstacle detection sensor of the moving robot shown in FIG. 14.

FIG. 15 is a front view and a side view of an obstacle detection sensor of the moving robot shown in FIG. 14, and FIGS. 16 to 18 are diagrams illustrating operation of an obstacle detection sensor of the moving robot shown in FIG. 14.

Referring to FIGS. 14 to 18, the moving robot 100 according to an embodiment of the present invention may include an obstacle detection sensor 171 which detects an obstacle using one or more optical patterns P1 and P2.

The optical patterns P1 and P2 may be horizontal patterns Ph. In some cases, the optical patterns P1 and P2 may include a vertical pattern Pv.

The obstacle detection sensor 171 using optical patterns may include a first pattern projection unit 1520, a second pattern projection unit 1530, and a pattern recognition unit 1540. The first pattern projection unit 1520, the second pattern projection unit 1530, and the pattern recognition unit 1540 may be disposed on a base unit 1510.

Figure 16:
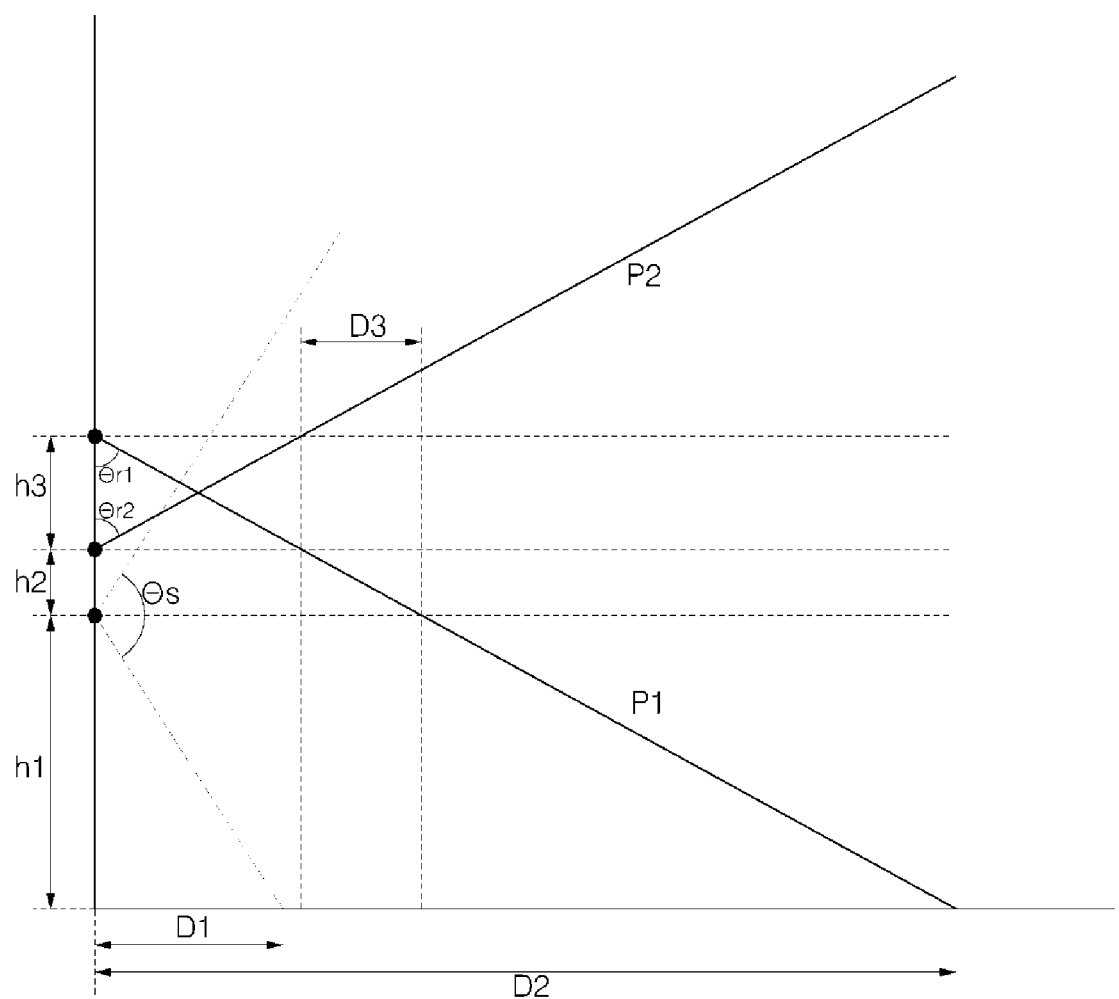

FIG. 15 is a front view and a side view of the obstacle detection sensor 171. FIG. 16 shows a projection range and an obstacle detection range of the obstacle detection sensor 171.

In FIG. 15, (a) is a front view of the obstacle detection sensor 171, and (b) is a side view of the obstacle detection sensor 171.

As shown in (a) and (b) of FIG. 15, each of the first and second pattern projection units 1520 and 530 of the obstacle detection sensor 171 may include a light source and an Optical Pattern Projection Element (OPPE) which generates a specific pattern as light emitted from the light source passes therethrough. The light source may be a Laser Diode (LD), a Light Emitting Diode (LED), or the like. Due to its characteristics excellent in monochromaticity, straightness, and connection, compared to other light sources, a laser beam may be used to measure a precise distance. In particular, an infrared ray or a visible ray may have a great deviation in precision of distance measurement due to an object's property such as color and material, and thus, a LD is desirable for a light source. The OPPE may include a lens and a Diffractive Optical Element (DOE). Depending on a configuration of an OPPE provided in each of the pattern projection units 1520 and 1530, various types of patterns may be projected.

The first pattern projection unit 1520 may project light P1 having a first pattern (hereinafter, referred to as a first pattern light) toward the low front side of the body 110. Thus, the first pattern light P1 may be incident on the floor of a cleaning area.

The first pattern light P1 may be in the form of a horizontal line Ph. In addition, the first pattern light P1 may be a cross pattern between the horizontal line Ph and the vertical line Pv.

The first pattern projection unit 1520, the second pattern projection unit 1530, and the pattern recognition unit 1540 may be vertically disposed in a row. The pattern recognition unit 1540 may be disposed below the first pattern projection unit 1520 and the second pattern projection unit 1530, but aspects of the present invention are not limited thereto. The pattern recognition unit 1540 may be disposed above the first pattern projection unit 1520 and the second pattern projection unit 1530.

In the example, the first pattern projection unit 1520 may be disposed in the upper side and project the first pattern light P1 forward and downward so as to detect an obstacle located lower than the first patter projection unit 1520, whereas the second pattern projection unit 1530 may be disposed below the first pattern projection unit 1520 and project a light having a second pattern (hereinafter, referred to as a second pattern light) P2 forward and upward. Thus, the second pattern light P2 may be incident on a wall or floor of a cleaning area up to at least an obstacle located higher than the second pattern projection unit 1530 or a certain portion of the obstacle.

The second pattern light P2 may be composed of a pattern different from the first pattern light P1, and may preferably include a horizontal line. The horizontal line is not necessarily a continuous segment, but may be a dotted line.

It is desirable that a horizontal angle of incidence of the first pattern projection unit 1520 and the second pattern projection unit 1530 is selected from the range of 130° to 140°.

The pattern recognition unit 1540 may acquire an image of an area forward of the body 110 (see FIG. 1). In particular, the pattern lights P1 and P2 are present in an image acquired by the pattern recognition unit 1540, and such pattern lights P1 and P2 present in the acquired image are referred to as light patterns that are images which are formed on an image sensor by the pattern lights P1 and P2 incident on an actual space. Thus, the same symbols of the pattern lights P1 and P2 are given, so images respectively corresponding to the first pattern light P1 and the second pattern light P2 are referred to as a first light pattern P1 and a second light pattern P2.

The pattern recognition unit 1540 may include a digital camera which converts an image of a subject into an electrical signal, convert the electrical signal into a digital signal, and store the digital signal in a memory device. The digital camera may include an image sensor (now shown) and an image processing unit (not shown).

The image sensor is a device that converts an optical image into an electrical signal, and composed of a chip where a plurality of photo diodes is integrated. One example of a photo diode may be a pixel. Due to images formed on the chip by lights passing through a lens, charges are accumulated in each pixel, and the charges accumulated in each pixel are converted into an electrical signal (e.g., a voltage). Examples of the image sensor may include a Charge Coupled Device (CCD), a Complementary Metal Oxide Semiconductor (CMOS), etc.

The image processing unit generates a digital image based on an analog signal output from the image sensor. The image processing unit may include: an AD converter which converts an analog signal into a digital signal; a buffer memory which temporarily stores digital data in accordance with a digital signal output from the AD converter; and a Digital Signal Processor (DSP) which processes information stored in the buffer memory to configure a digital image.

The controller 140 (see FIG. 6) may detect a feature, such as a dot, a line, and a surface, from specific pixels which forms an acquired image. Based on the detected features, the controller 140 may detect the light patterns P1 and P2, or a dot, a line, a surface, etc. which forms the light patterns P1 and P2.

For example, the controller 140 may extract segments formed by bright pixels in an acquired image, and extract a horizontal line Ph forming the first light pattern P1 and a horizontal line forming the second light pattern P2.

However aspects of the present invention are not limited thereto, and other various techniques for extracting a desired pattern from a digital image are already well known. Using such well-known techniques, the pattern detection unit 210 may extract the first light pattern P1 and the second light pattern P2.

As illustrated in FIG. 7, the first pattern projection unit 1520 and the second pattern projection unit 1530 may be disposed symmetrically. The first pattern projection unit 1520 and the second pattern projection unit 1530 are vertically spaced apart at distance h3 from each other, and thus, the first pattern projection unit 1520 projects the first pattern light downward and the second pattern projection unit 1530 projects the second pattern light upward so that the pattern lights respectively output from the first pattern projection unit 1520 and the second pattern projection unit 1530 intersects each other.

The pattern recognition unit 1540 is disposed at distance h2 lower from the second pattern projection unit 1530 to capture an image of an area forward of the body 110 with an angle view θs in the top-bottom direction. It is desirable that the pattern recognition unit 1540 is disposed in a bumper (now shown), which defines the lower front part of the body 110 of the moving robot 100, or disposed in a location where it is easy to image the forward area considering travelling of the moving robot 100 or the structure to be cleaned.

The first pattern projection unit 1520 or the second pattern projection unit 1530 is installed such that optical axes of lenses in the pattern projection units 1520 and 1530 are directed to form a certain angle of incidence.

The first pattern projection unit 1520 projects the first pattern light Pa downward at a first angle of incidence $\theta r1$, and the second pattern projection unit 1530 projects the second pattern light P2 upward at a second angle of incidence $\theta r2$. The first angle of incidence and the second angle of incidence are basically different, but they may be set to be identical in some cases. For example, the first angle of incidence may be set to be 60° to 70°, and the second angle of incidence may be set to be 50° to 55°. The first and second angles of incidence may be changed depending on the structure of a lower bumper of the moving robot 100, a range for detection of a low positioned object, and a height of a high positioned object to be detected.

When a pattern light projected by the first pattern projection unit 1520 and/or the second pattern projection unit 1530 is incident on an obstacle, a light pattern P1 or P2 may be at different positions depending on how far the obstacle is located from the first pattern projection unit 1520. For example, when the first pattern light P1 and the second pattern light P2 are incident on a specific obstacle, the closer the obstacle is located to the moving robot 100, the higher the first light pattern P1 is presented on an acquired image and the lower the second light pattern P2 is presented on the acquired image. That is, data about a distance to an obstacle corresponding to a row (which is a line consisting of pixels arranged in the transverse direction) in an image generated by the pattern recognition unit 1540 is stored in advance. Then, when the light patterns P1 and P2 are detected from a specific row from an image acquired by the pattern recognition unit 1540, a location of an obstacle may be estimated based on data about a distance to an obstacle corresponding to the row.

The pattern recognition unit 1540 is disposed toward a horizontal direction of an optical axis of a lens. θs in FIG. 16 indicates an angle view of the pattern recognition unit 1540 and may be set to be a value equal to or greater than 100°. θ is preferably between 100° and 110°, but aspects of the present invention are not limited thereto.

In addition, a distance from a floor of a cleaning area to the pattern recognition unit 1540 may be set to be about between 60 mm and 70 mm. In this case, the floor of the cleaning area may be displayed in an image acquired by the pattern recognition unit 1540 after D1, and D2 is a location where the first light pattern P1 is displayed on a floor shown in the acquired image. If an obstacle is located at D2, an image showing that the first pattern light P1 is incident on the obstacle may be acquired by the pattern recognition unit 1540. If the obstacle is in the vicinity of the moving robot 100 than D2, the first light pattern may be presented above a reference level ref1 in response to the incident first pattern light P1.

A distance from the body 110 to D1 is preferably between 100 mm and 150 mm, and a distance from the body 110 to D2 is preferably between 180 mm and 280 mm, but aspects of the present invention are not limited thereto. Meanwhile, D3 is a distance from the most protruding portion in the front side of the body 110 to a location where a second pattern light is incident. The body 110 detects an obstacle during travelling, and thus, D3 indicates the minimum distance by which the moving robot 100 is allowed to detect an obstacle ahead (or located above) without colliding with the obstacle. D3 may be set to be about between 23 mm and 30 mm.

Meanwhile, if the first light pattern P1 shown in an acquired image disappears during travelling of the body 110 or when only portion of the first light pattern is presented, the controller 140 may determine that a cliff exists in the vicinity of the moving robot 100.

When the first light pattern is not displayed in the acquired image, the controller 140 may recognize a cliff existing in front of the moving robot 100. When a cliff (e.g., stairs) exists in front of the moving robot 100, the first pattern light is not incident on the floor, and thus, the first light pattern P1 disappears from the acquired image.

Based on a length of D2, the controller 140 determines that a cliff exists at a distance D2 ahead of the body 110. In this case, when the first pattern light P1 is a cross pattern, a horizontal line disappears and only a vertical line is left, and thus, it is possible to determine the presence of the cliff.

In addition, when a portion of the first light pattern is not displayed, the controller 140 may determine that a cliff exists on the left or right side of the moving robot 100. When a portion of the right side of the first light pattern is not displayed, the controller 140 may determine that a cliff exists on the right side of the moving robot 100.

Thus, based on the cliff information, the controller 140 may control the travel unit 160 (see FIG. 6) so that the moving robot 100 travels along a path without falling off the cliff.

In addition, when a cliff exists in front of the moving robot 100, the controller 140 may control travelling a predetermined distance, e.g., D2 or less, forward in straight and then check again, using a cliff sensor installed at the lower portion of the body 110, whether there is a cliff. The moving robot 100 may first check the presence of a cliff using an acquired image, and then check again the presence of a cliff after travelling a predetermined distance.

FIG. 17 is a diagram illustrating a light pattern projected by a first pattern projection unit.

The controller 140 may detect a first light pattern or a second light pattern from an image acquired by the pattern recognition unit 1540, analyze the first light patter or the second light pattern, and compare a location of the first light pattern with a reference level ref1 so as to determine an obstacle.

As illustrated in (a) of FIG. 17, when a horizontal line of the first light pattern P1 is at the reference level ref1, the controller 140 determines a normal state. The normal state indicates that the floor is flat and even and there is no obstacle ahead so that the moving robot 100 is able to keep travelling.

When an obstacle exits in an upper forward area, the second light pattern P2 is incident on the obstacle and presented in an acquired image, and thus, the second light pattern P2 is usually not presented in the normal state.

As illustrated in (b) of FIG. 17, when a horizontal line of the first light pattern P1 is positioned higher than the reference level ref1, the controller 140 determines that an obstacle exists ahead.

As illustrated in the drawing, when an obstacle is detected, the controller 150 may control the travel unit 160 to travel by detouring around the obstacle.

Meanwhile, the controller 140 may determine locations of the first and second light patterns P1 and P2, and a location and a size of an obstacle which is detected in response to the presence of the second light pattern. In addition, the controller 140 may determine the location and the size of the obstacle based on change of the first and second light patterns P1 and P2 displayed in an image which is acquired during travelling.

By determining whether it is possible to keep travelling despite of a recognized obstacle or whether it is necessary to travel by detouring around the recognized obstacle, the controller 140 may control the travel unit 160. For example, when a height of an obstacle is lower than a predetermined height or when it is possible to enter a space between the obstacle and the floor, the controller 140 may determine that it is possible to keep travelling.

As illustrated in (c) of FIG. 17, the first light pattern P1 may be displayed lower than the reference level ref1. When the first light pattern P1 is displayed lower than the reference level ref1, the controller 140 may determine that a descending slope exists. In the case of a cliff, the first light pattern P1 disappears. Thus, the descending slope can be distinguished from the cliff.

As illustrated in (d) of FIG. 17, when the first light pattern P1 is not displayed, the controller 140 may determine that a cliff exists in a direction of travel.

In addition, as illustrated in (e) of FIG. 17, when a portion of the first light pattern P1 is not displayed, the controller 140 may determine that a cliff exists on the left or right side of the moving robot 100.

Meanwhile, when the first light pattern P1 is a cross pattern, the controller 140 may determine the presence of an obstacle by taking into account a location of the horizontal line and a length of the vertical line.

Figure 18:
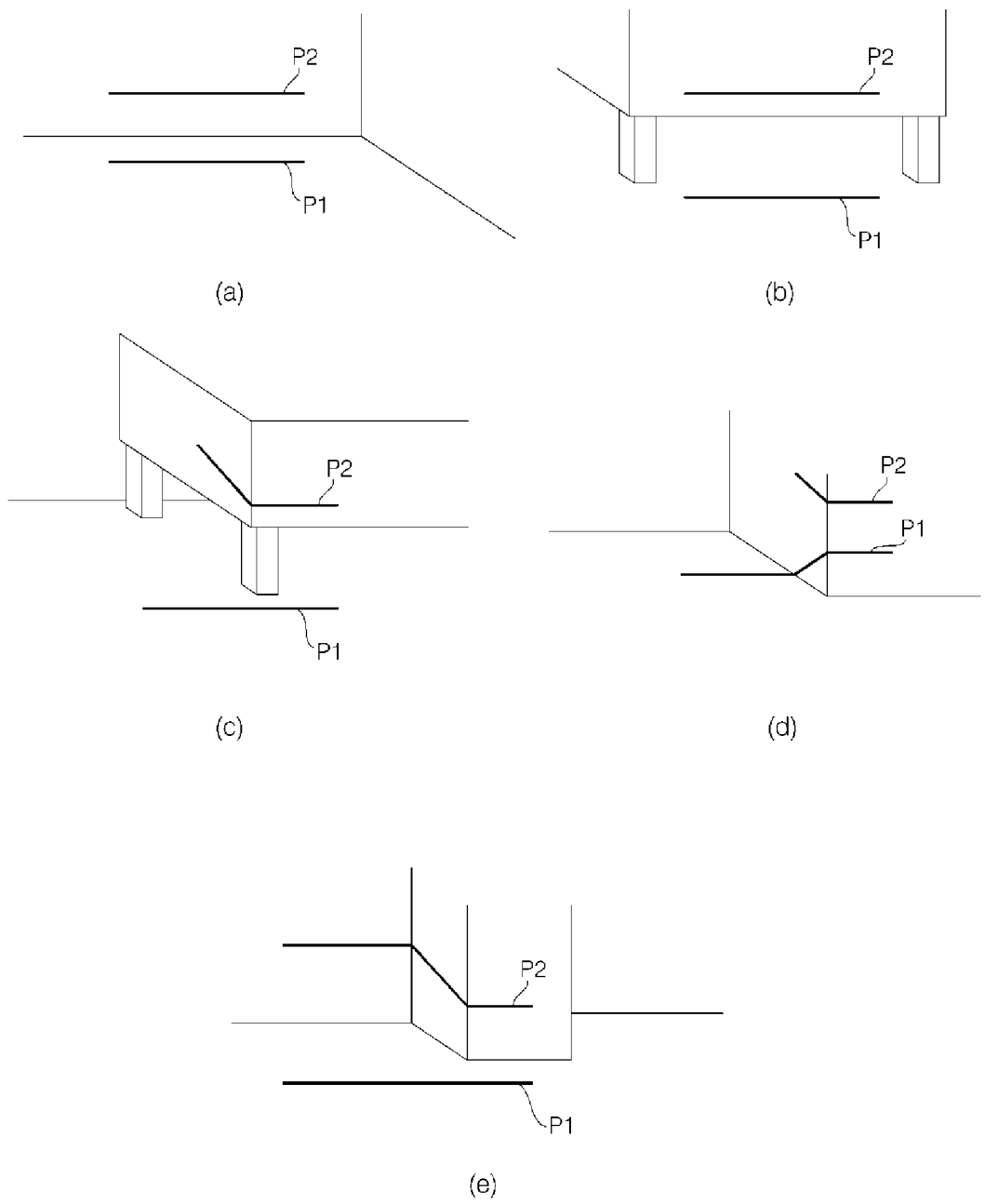

FIG. 18 is a diagram illustrating an example of a pattern which is projected to an obstacle by a moving robot according to an embodiment of the present invention.

As illustrated in FIG. 18, a pattern light is projected by the obstacle detection sensor 171 to an obstacle and presented in a captured image. Accordingly, the controller 140 may determine a location, a size, and a shape of the obstacle.

As illustrated in (a) of FIG. 18, when a wall exists ahead during travelling of the moving robot 100, a first pattern light is incident on the floor and a second pattern light is incident on the wall. Accordingly, the first light pattern P1 and the second light pattern P2 are displayed as two horizontal lines on an acquired image. In this case, if a distance to the wall is greater than D2, the first light pattern P1 may be displayed at a reference level ref1 but the controller 140 may determine the presence of the obstacle because the second light pattern P2 is displayed.

Meanwhile, if the distance to the wall is smaller than D2, the first pattern light is not incident on the floor but on the wall, and thus, the first light pattern is displayed higher than the reference level ref1 on the acquired image, and the second light pattern is displayed higher than the first light pattern. The closer the body 110 is located to an obstacle, the lower the second light pattern is displayed in the acquired image. Thus, if a distance between the wall and the body 110 is greater than D2, the second light pattern P2 is displayed lower in the acquired image. However, the second pattern light is displayed higher in the image than the reference level ref1 and the first light pattern.

Accordingly, the controller 140 may calculate a distance to the wall, which is an obstacle based on the first light pattern and the second light pattern.

As illustrated in (b) of FIG. 18, if an obstacle, such as a bed and a drawer, exists ahead, the first pattern light P1 and the second pattern light P2 are incident on the floor and the obstacle as two horizontal lines.

The controller 140 determines the presence of an obstacle based on the first light pattern and the second light pattern.

The controller 140 may determine a height of the obstacle based on a location of the second light pattern and a change in the second light pattern occurring while the moving robot 100 approaches the obstacle. Accordingly, the controller 140 controls the travel unit 160 by determining whether it is possible to enter a space below the obstacle.

For example, when there is an obstacle, such as a bed, which forms a space with the floor in a cleaning area, the controller may determine a height of the space and determine whether to pass through or avoid the obstacle. If the height of the space is lower than a height of the body 110, the controller 140 may control the travel unit 160 so that the body 110 travels by detouring around the obstacle. In contrast, if the height of the space is higher than the height of the body 110, the controller 140 may control the travel unit 160 so that the body 110 enter or pass through the space.

In this case, even in the example (a) of FIG. 18, the first light pattern and the second light pattern are displayed as two horizontal lines, but the controller 140 may distinguish the two horizontal lines because there is a distance between the first light pattern and the second light pattern. In addition, in the case of the example (a) of FIG. 18, the first light pattern is displayed higher than the reference level ref1 if the moving robot 100 is located close to an obstacle. However, in the example (b) of FIG. 18 where an obstacle exists above the moving robot 100, the first light pattern P1 is displayed at the reference level ref1 despite a short distance from the obstacle and the location of the second light pattern P2 is changed, and thus, the controller 140 may be able to identify a type of the obstacle.

As shown in the example (c) of FIG. 18, if an obstacle is a bed or a drawer, the first pattern light P1 is projected on the floor as a horizontal line whereas the second pattern light P2 is projected on an edge of the obstacle. Thus, some of the second pattern light P2 is displayed as a horizontal line and the rest thereof is diagonally incident on the obstacle. The second light pattern P2 is displayed high when the obstacle is located far from the body 110, and thus, a side surface of the obstacle may be displayed as a diagonal line which is bent upward from the horizontal line projected on the front side of the body 110.

As illustrated in (d) of FIG. 18, if the body 10 is a predetermined distance or less to a wall edge, a part of the first pattern light P1 is displayed as a horizontal line higher than the reference level ref1, a part of the first pattern light P1 is projected on a side surface over the edge and displayed as a diagonal line bent downward, and the rest part of the first pattern light P1 is projected on the floor and displayed as a horizontal line at the reference level ref1.

Meanwhile, similarly to the example (c) of FIG. 18, some of the second pattern light is displayed as a horizontal line and the rest thereof projected and incident on a side surface over the edge is displayed as a diagonal line bent upward.

In addition, similarly to the example (e) of FIG. 18, the first light pattern is displayed as a horizontal line at the reference level ref1 with respect to an obstacle protruding from a wall, and a part of the second light pattern P2 is displayed as a horizontal line on the protruding surface, a part of the second light pattern P2 is incident on a side surface over the protruding surface and displayed as a diagonal line bent upward, and the rest part of the second light pattern P2 is projected onto the wall and displayed as a horizontal line.

Accordingly, the controller 140 may determine a location, a shape, and a size (height) of an obstacle based on locations and shapes of the first pattern light and the second pattern light.

Figure 19:
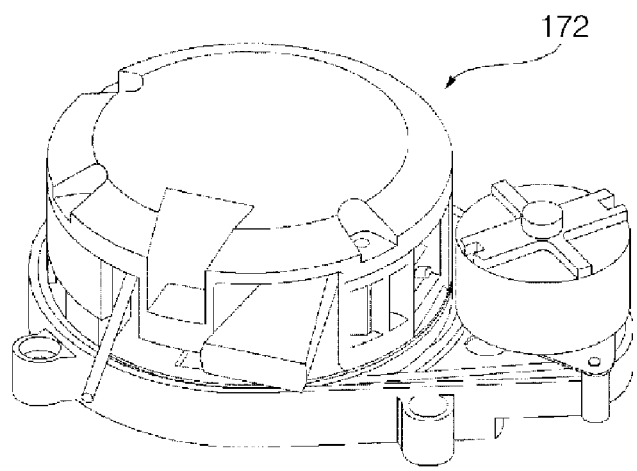
FIGS. 19 and 20 are diagrams illustrating an obstacle detection sensor unit of a moving robot according to an embodiment of the present invention.
Figure 20:
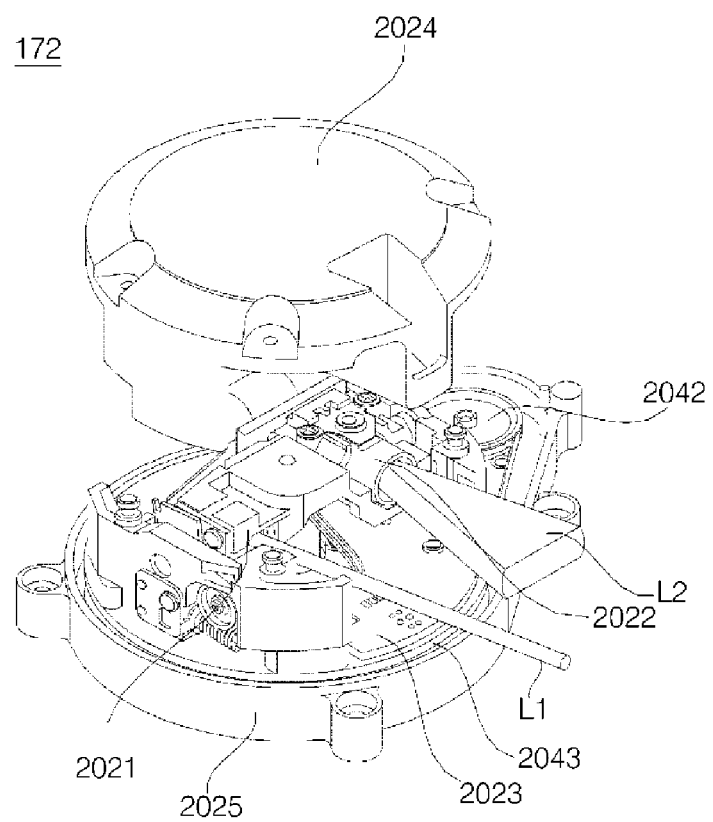
Figure 21:
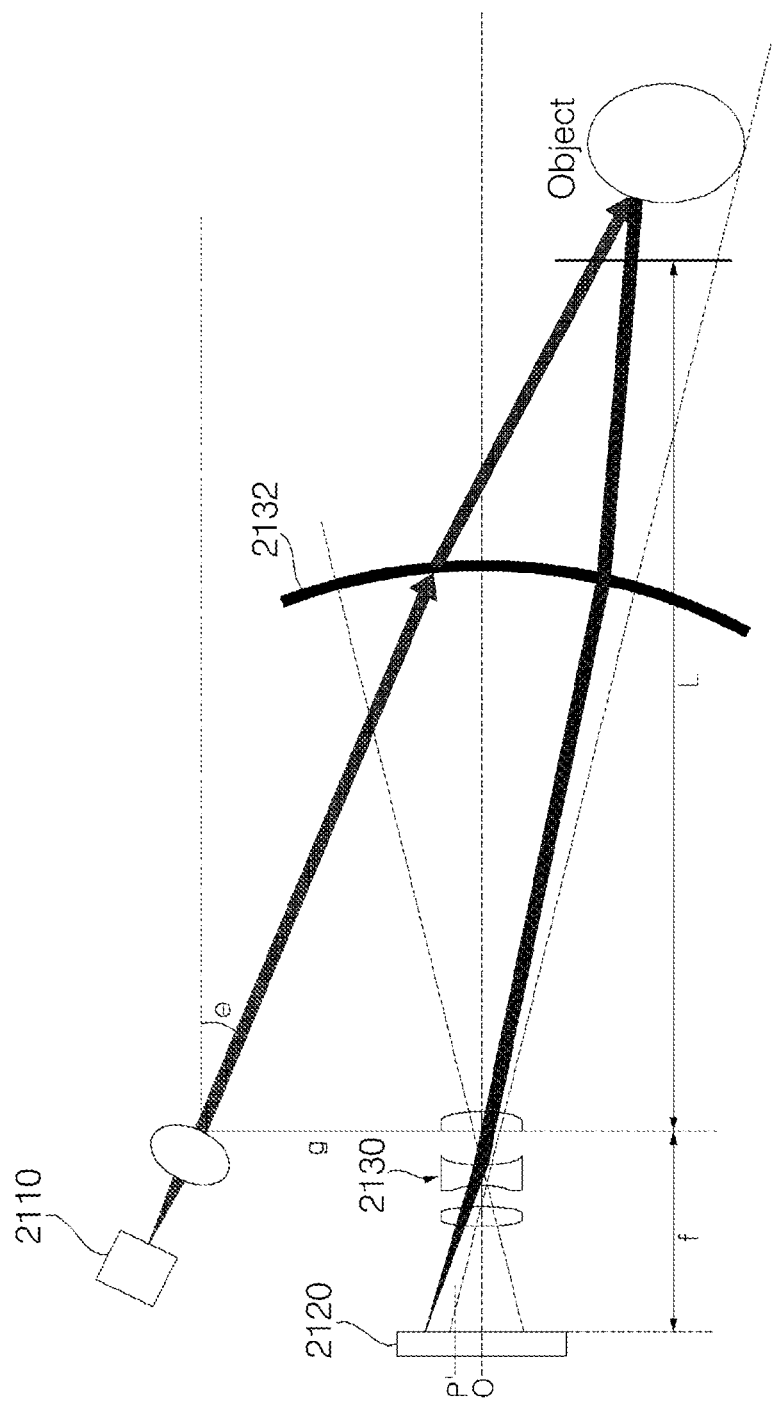
FIG. 21 is a diagram for explaining a principle of how the sensor unit shown in FIGS. 19 and 20 detects an obstacle in a detection range.

FIGS. 19 and 20 are diagrams illustrating an obstacle detection sensor unit of a moving robot according to an embodiment of the present invention, and FIG. 21 is a diagram for explaining a principle of how the sensor unit shown in FIGS. 19 and 20 detects an obstacle in a detection range.

Referring to FIGS. 19 and 20, an obstacle detection sensor unit 172 emits light L1 to detect a location of an obstacle or a distance to the obstacle. The obstacle detection sensor unit 172 is rotatably and elevatably provided in the obstacle detection sensor unit. The obstacle detection sensor unit 172 may include a light emitting unit 2021, a light receiving unit 2022, and a base 2023.

The obstacle detection sensor unit 172 may include: an elevation driving unit (not shown) which moves the obstacle detection sensor unit 172 upward and downward; a tilt driving unit (now shown) which adjusts a sensing angle of the obstacle detection sensor unit 172; and a rotation driving unit (not shown) which rotates the obstacle detection sensor unit 172.

The light emitting unit 2021 may emits the light L1, and include a light source and a collimate lens which refracts light emitted from the light source so that the light travels in a parallel direction. A light emitting body which emits an infrared ray or a visible ray, such as an infrared or visible LED, may be used as the light source. However, a light emitting body which emits a laser beam is desirable.

The light receiving unit 2022 may include an image sensor on which a light spot of light L2 reflected or scattered by an obstacle is formed. The image sensor is a group of multiple unit pixels disposed in a matrix form of n×m. Each unit pixel may be implemented as any of various light receiving devices, such as a cadmium sulfide cell (CSC), a photo diode, a photo transistor, a solar cell, and a photoelectric tube, and such light receiving devices converts an optical signal of light into an electric signal. In addition, the light receiving unit 2022 may include a light receiving lens through which light reflected or scattered by an obstacle passes to be refracted and thereby formed on the image sensor. The light receiving lens may be composed of a plurality of lens.

The base 2023 supports the light emitting unit 2021 and the light receiving unit 2022, and is able to rotate and elevate with respect to the body 110. The light emitting unit 2021 and the image sensor may be disposed on the base 2023 while spaced apart at a predetermine distance from each other.

Meanwhile, the obstacle detection sensor unit 172 may further include a supporter 2025 to support the obstacle detection sensor unit 172, and the base may be rotatably supported by the support 2025. The supporter 2025 may be fixed to the lower part of the body 110 (see FIG. 1) by a fastening member, such as a screw and a bolt, and in this case, the elevation driving unit which will be described in the following may elevate the base 2023. However, aspects of the present invention are not limited thereto, and the base 2023 may be elevatably disposed in a top-down direction with respect to the lower part of the body 110 due to the elevation driving unit.

A base cover 2024 is coupled to the base 2023 to thereby rotate in conjunction with the base 2023. Between the base cover 2024 and the base 2023, there may be a light transmitting channel, through which the light L1 emitted from the light emitting unit 2021 passes, and a light receiving channel, through which light is received by the light receiving unit 2022.

The elevation driving unit elevates the obstacle detection sensor unit 171. The elevation driving unit may include a linear or rotation motor. There may be a power transfer means which helps transfer or shift of power between the elevation driving unit and the obstacle detection sensor unit 172 so as to elevate the obstacle detection sensor unit 172, and the power transfer means may be implemented as various devices, such as a gear, a pulley 2042, and a belt 2043. For example, if the elevation driving unit is implemented as a rotation motor, the power transfer means may include a drive pinion which is rotated by the motor, and a rack which is fixed onto the base and engaged with the drive pinion.

The obstacle detection sensor unit 172 may elevate through an elevation hole (not shown) formed on the upper part of the body 110. In the case where the obstacle detection sensor unit 172 elevate in the top-down direction, if the obstacle detection sensor unit 172 is in the down position, the light L1 emitted from the light emitting unit 2021 of the obstacle detection sensor unit 172 is directed forward of the body 110 through a transparent member which is installed in the obstacle detection sensor unit 172, and the light L2 reflected or scattered by the obstacle may pass through the transparent member to be thereby incident on the light receiving unit 2022.

If the obstacle detection sensor unit 172 is in the up position, the obstacle detection sensor unit 172 protrudes toward the top of the body 110 through the elevation hole, and even the light emitting unit 2021 and the light receiving unit 2022 are positioned upper in the body 110.

FIG. 21 is a diagram illustrating a principle how to measure a distance to an object. Referring to FIG. 21, the basic principle of how the obstacle detection sensor unit 172 detects a location of an object is using triangulation.

Light emitted from the light source 2110 has a specific angle relative to an optical axis C of a light receiving lens 2130. In particular, an angle is closely related to precision of measuring a distance to an object. Thus, it may be difficult to measure a distance to a nearby object, and thus, if the angle is too small, whereas it may be difficult to measure a distance to a distant object if the angle is too great. Thus, the angle needs to have an appropriate value that is preferably a value which makes it possible to measure a distance in a range of 0.1 m to 4 m.

The image sensor 2120 is spaced apart from the light source 2110, and the light receiving lens 2130 is disposed between the image sensor 2120 and the object or an obstacle 300. In this case, a distance between the obstacle and the light receiving lens 2130 is defined as an object distance "L", and the object distance "L" is calculated by Equation 1 as below.

$$L = \frac{-fg}{p - f\tan\Theta} \quad [\text{Equation 1}]$$

In Equation 1, f is a focal length, g is a distance between the light source 2110 and a lens, θ is an angle between a light emitted from the light source 2110 and the optical axis C of the light receiving lens 2130, and p is a location of a light spot of light, reflected or scattered by the object, on the image sensor relative to the center o of the image sensor 2120.

Meanwhile, only when light emitted from the light source 2110 passes through the transparent member 2132, a light spot is formed on the image sensor 2120, and thus, location information used in mapping a cleaning area may be obtained from a range corresponding to a profile of the transparent member 2132, e.g., an angle of 0° to 180°.

The following description is about an example in which an object is detected using an ultrasonic sensor, but aspects of the present invention are not limited thereto. For example, it is obvious that other methods described above with reference to FIGS. 14 to 21 can be used to detect an object.

Figure 22:
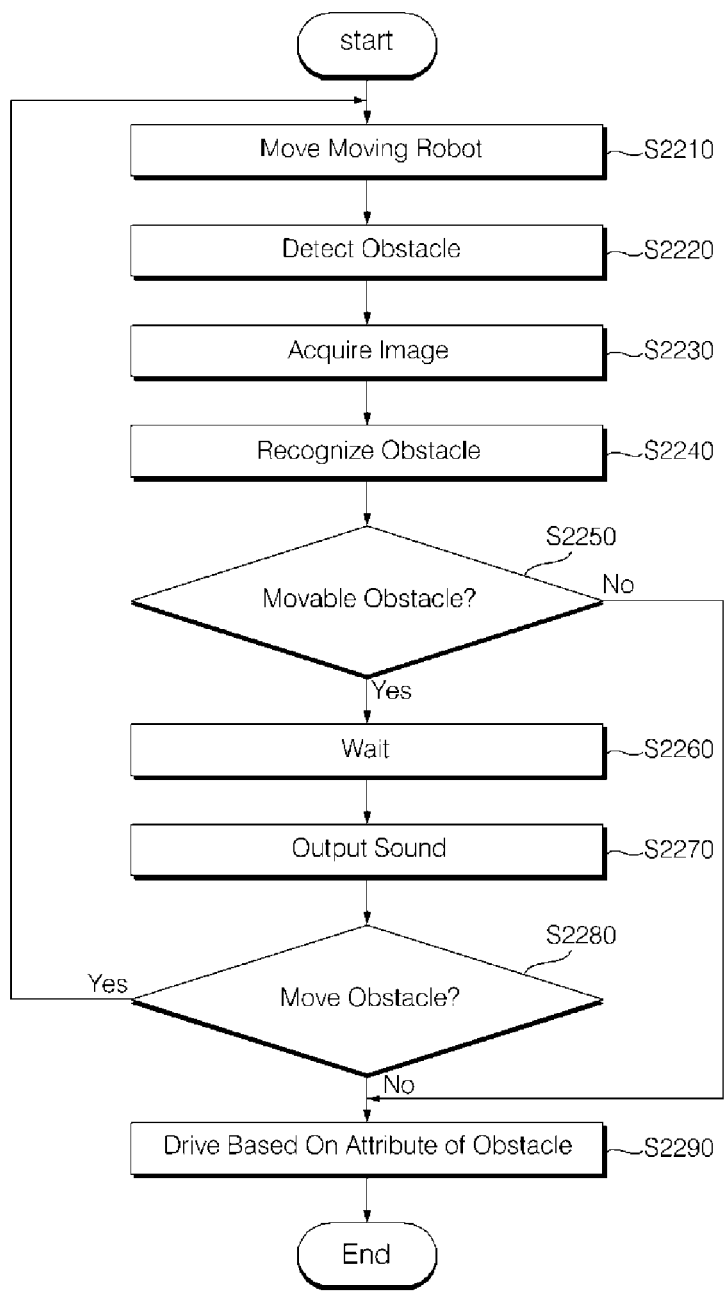
FIG. 22 is a flowchart illustrating a control method of a moving robot according to an embodiment of the present invention.

FIG. 22 is a flowchart illustrating a control method of a moving robot according to an embodiment of the present invention.

Referring to FIGS. 2 to 6, and 22, the moving robot 100 may perform cleaning while moving in accordance of a command or its settings (S2210).

The sensor unit 170 includes an object detection sensor 131, 171, or 172 and detects an obstacle while moving.

If an obstacle is detected using the sensor unit 170 while the moving robot 100 moves (S2220), the image acquisition unit 120 may acquire an image of an area forward of the body 110 (S2230).

In addition, from among images being acquired by the image acquisition unit 120, an image captured at the same time as an object detection time of the sensor unit 170 or an image captured before the object detection time of the sensor unit 170 is selected and used as an image to recognize an obstacle.

When the sensor unit 170 detects the obstacle, the obstacle detection module 144 may recognize an attribute of the detected obstacle based on the images acquired by the image acquisition unit 120 (S2240).

It is more desirable that the obstacle recognition module 144 may recognize the obstacle based on data which is pre-learned by machine learning from images acquired by the images acquired by the image acquisition unit 120 (S2240).

The obstacle recognition module 144 may include the ANN which is trained by machine learning to recognize object attributes, such as type, and the obstacle recognition module 144 may recognize an attribute of the detected obstacle based on pre-learned data.

For example, the obstacle recognition module 144 may be embedded with the CNN which is one of deep learning structures, and the pre-learned CNN may recognize an obstacle attribute included in input data and output a result.

The obstacle recognition module 144 trained using the machine learning may have a higher recognition rate if a learned subject accounts for a greater portion of input image data.

Thus, according to an embodiment of the present invention, a partial region from an image acquired by the image acquisition unit 120 is extracted according to a direction from the object is detected by the sensor, and then used as data for recognition, thereby improving a recognition rate.

Cropping and extracting a partial region from an image acquired by the image acquisition unit 120 will be described in detail with reference to FIGS. 27 to 30.

Meanwhile, the driving control module 141 may control driving of the travel unit 160 based on the attribute of the recognized obstacle (S2290).

For example, if the recognized obstacle is an obstacle which is too high for the moving robot 100 to go over, the driving control module 141 may perform a control operation so that the moving robot 100 travels by detouring around the obstacle.

In addition, if the recognized obstacle is an obstacle which is low enough for the moving robot 100 to go over, such as a low step, the travel control module 141 may perform a control operation so that the moving robot 100 keeps travelling forward in straight.

In addition, if an obstacle having a low height, such as a fan base, a multitap, and a wire, is recognized as a dangerous obstacle which would possibly constrain the moving robot 100, the driving control module 141 may perform a control operation so that the moving robot 100 travels by detouring around the obstacle.

Meanwhile, if the attribute of the recognized obstacle indicates a movable obstacle, the controller 140 may control the sound output unit 181 to output preset sound (S2270).

The movable obstacle may be part of a human body or a pet, and the preset sound may be alert sound or a message for guiding the movable obstacle to move.

For example, if at least part of a human body, such as a foot and a hand, is recognized, the controller 140 may control the sound output unit 181 to output a message for guiding the person to step aside.

In addition, if a pet, such as a dog and a cat, is recognized, the controller 140 may control the sound output unit 181 t output alert sound so that the pet moves in response to the sound.

Meanwhile, if the attribute of the recognized obstacle indicates a movable obstacle, the controller 140 may control the travel unit 160 to stop moving the body 110 and wait for a while (S2260).

Meanwhile, FIG. 22 shows an example of a flow of how to output sound (S2270) after waiting (S2260), but aspects of the present invention are not limited thereto. For example, it is possible to output sound and then stop moving the body 110, or to output sound at a time when stopping moving the body 110.

Meanwhile, the controller 140 may output alert sound or a message for guiding the movable obstacle to move (S2270), and wait for a particular standby time until the movable obstacle moves (S2260).

Meanwhile, the sensor nit 170 may detect whether the movable obstacle moves within the particular standby time (S2280). In the case of a movable obstacle, the controller 140 may determine whether the movable obstacle moves for a particular standby time, and control the moving robot to travel in different ways according to a result of the determination.

When movement of the movable obstacle is detected within the particular standby time (S2280), the controller 140 may perform a control operation so that the moving robot 100 resumes previous movement which was performed before the stopping of the body 110 (S2260).

That is, if the movable obstacle moves within the particular standby time, a constraint to movement of the moving robot 100 is eliminated and thus it is possible to resume movement in the previous driving pattern.

If movement of the movable obstacle is not detected within the particular standby time (S2280), the controller 140 may perform avoidance driving with respect to the movable obstacle (S2290).

That is, if the movable obstacle does not move within the particular standby time, the moving robot 100 may perform avoidance driving with respect to the movable obstacle.

Meanwhile, the controller 140 may control the body 110 to travel forward and backward repeatedly within a predetermined distance range.

It is desirable that the controller 140 may control the body 1110 to travel forward and backward repeatedly, as if it is startled, for a particular standby time to wait until the movable obstacle moves. Accordingly, due to the startled movement of the moving robot 100 as well as a guidance message, a user is able to intuitively know that the moving robot 100 waits the user to move.

Usually, if one of family member is standing within a cleaning area, a person cleaning the area asks the family member to move away.

Considering such a general situation found in ordinary family, the moving robot 100 may output sound "It's now cleaning. Please move your foot" upon detection of a movable obstacle, such as a person's foot and a hand.

Accordingly, a user is able to know that the moving robot 100 has recognized the user's foot, and have a higher reliability of the moving robot 100.

In addition, if a family member is located in a cleaning area, avoidance driving needs to be performed and thus that area cannot be cleaned according to existing technologies. The present invention reduces a possibility of occurrence of this case, and thus increases efficiency in cleaning.

Figure 23:
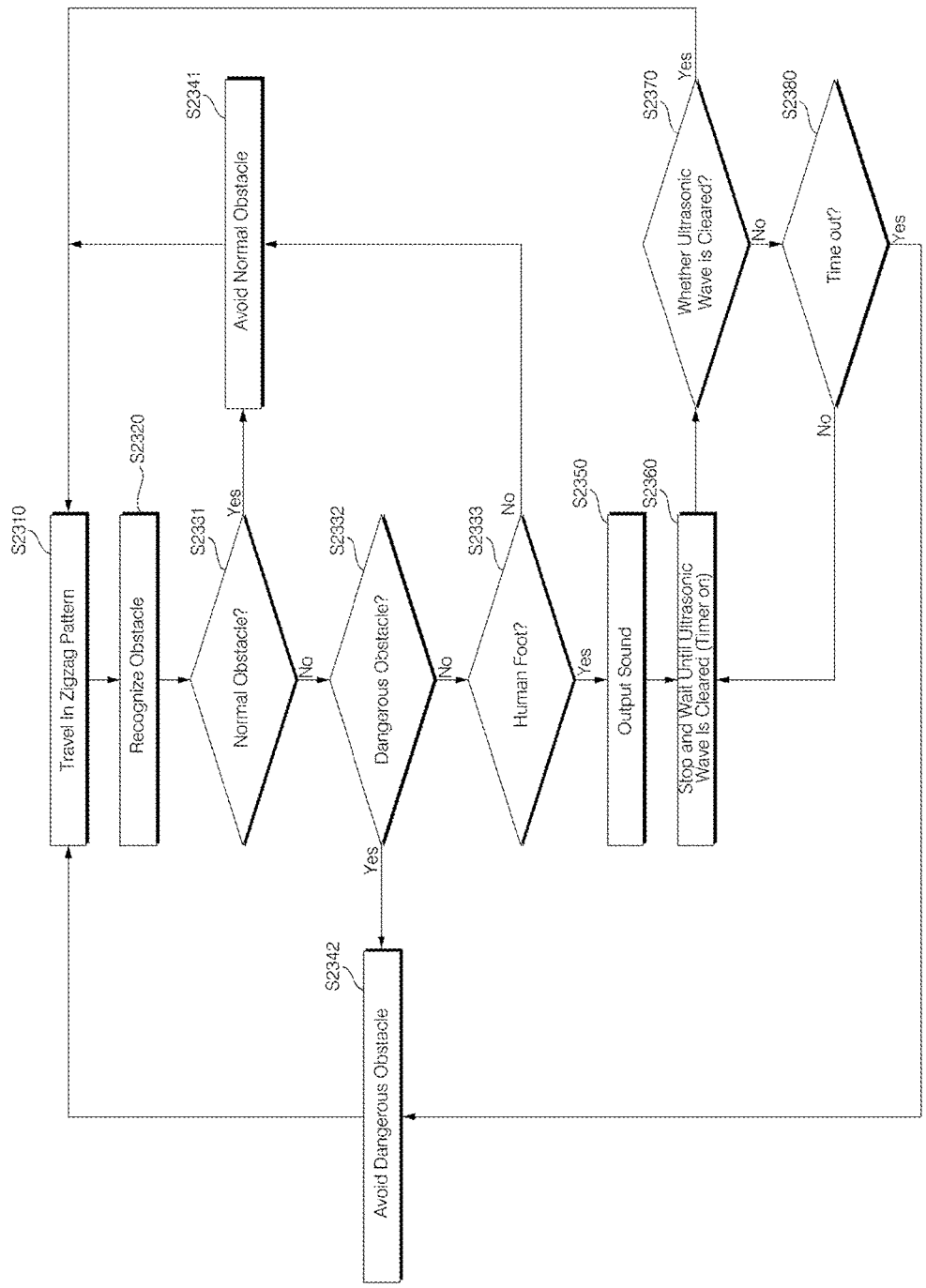
FIG. 23 is a flowchart illustrating a control method of a moving robot according to an embodiment of the present invention.

FIG. 23 is a flowchart illustrating a control method of a moving robot according to an embodiment of the present invention, and shows an example in which the sensor unit 170 recognizes a human foot using an infrared sensor.

Referring to FIG. 23, the moving robot 100 may move in a preset pattern in accordance with a command or its settings (S2310). For example, the moving robot 100 may perform cleaning while travelling in a zigzag pattern (S2310).

In the case where the sensor unit 170 includes an infrared sensor, the sensor unit 170 may detect the presence of an obstacle by detecting a reflected ultrasonic signal and the controller 140 may recognize an attribute of the obstacle based on an image acquired by the image acquisition unit 120 (S2320).

Meanwhile, the image acquisition unit 120 may acquire an image by constantly capturing an area in the front side of and in the surroundings of the moving robot 100 or capturing an area in the front side of and in the surroundings of the moving robot 100 upon detection of an obstacle by the sensor unit 170.

Meanwhile, the controller 140 may control the moving robot 100 to travel based on the attribute of the recognized obstacle.

For example, if the recognized obstacle is a normal obstacle (a not-dangerous obstacle) (S2331), the controller 140 control the moving robot 100 to perform normal obstacle avoidance driving (S2341).

In addition, if the recognized obstacle is a dangerous obstacle (S2332), the controller 140 may control the moving robot to perform dangerous obstacle avoidance driving (S2342).

The normal obstacle avoidance driving and the dangerous obstacle avoidance driving may be different in terms of at least one of: a distance to an obstacle which is required to be secured during avoidance driving; an angle of rotation of the moving robot 100; and an avoidance driving pattern.

In addition, if the recognized obstacle is a human foot (S2334), the controller 140 may control the sound output unit 181 to output sound (S2350).

For example, the sound output unit 181 may provide a user with a voice notification saying "It is now cleaning. Please step aside." That is, it is possible to inform the user of the recognition of the human foot, and provide information that the user is able to move out of a cleaning area.

In addition, the controller 140 may stop moving the moving robot 100 (S2360), and determine whether a person moves within a particular standby time (S2370, S2380).

Meanwhile, the controller 140 may turn on a timer to determine whether the particular standby time elapses. The timer may be provided inside the controller 140 or may be an additional timer outside the controller 140.

For example, if an obstacle detected by the ultrasonic sensor moves, a reflected ultrasonic signal is cleared, and thus, movement of a movable obstacle may be determined based on whether or not an ultrasonic signal is cleared.

If the ultrasonic signal is cleared (S2370), it may be determined that a person ahead steps aside and thus it is possible to resume the previous movement of the zigzag pattern (S2310).

If the standby time is out because movement of an obstacle is not determined for the particular standby time (S2380), the controller 140 may perform a control operation so that a predetermined avoidance operation is performed.

For example, if the standby time is out (S2380), the controller 140 may perform a control operation so that dangerous obstacle avoidance driving is performed (S2342).

FIGS. 24 to 32 are diagrams for explaining a control method of a moving robot according to an embodiment of the present invention.

Figure 24:
FIGS. 24 to 32 are diagrams for explaining a control method of a moving robot according to an embodiment of the present invention.

Referring to FIG. 24, when a movable object, such as a person (foot) is recognized during travelling, the moving robot 100 may provide a notification, e.g., "It is now cleaning. Please step aside." Then, the moving robot 100 may keep cleaning if the movable object moves within a predetermined time, whereas the moving robot 100 may perform obstacle avoidance driving if the movable object does not move within a predetermined time.

Accordingly, it is possible to prevent collision between the moving robot 100 and a user, and increase cleaning efficiency.

In addition, people often sit on the floor at home with their hand on the floor.

Figure 25:
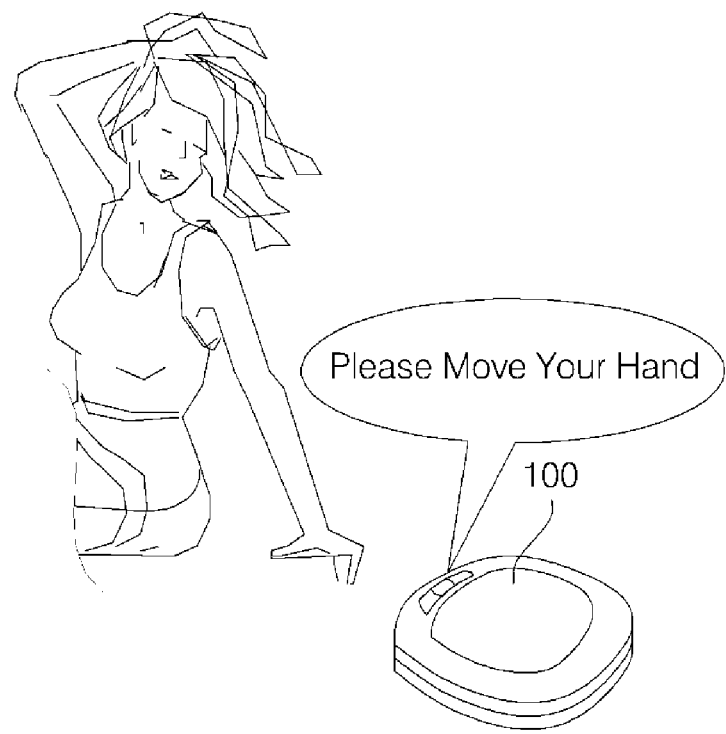

Thus, as shown in FIG. 25, when a human hand or arm is detected during travelling, the moving robot 100 may provide a user with a notification, for example, "Please move your hand."

In addition, if a recognized body part, such as a foot, a hand, and an arm, is accurately informed to the user, it may increase user confidence.

Figure 26:
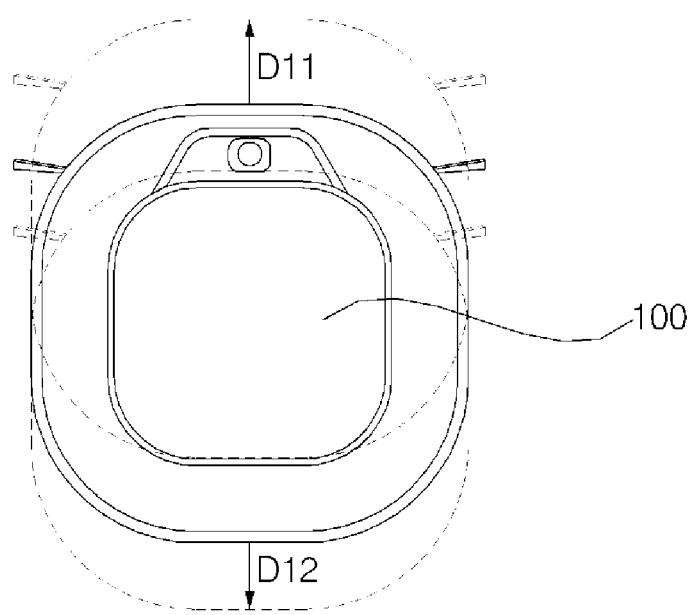

FIG. 26 is a diagram illustrating an example in which the moving robot 100 travels forward and backward repeatedly for a standby time.

Referring to FIG. 26, when waiting for a movable object to move, the moving robot 100 may travel a first distance D11 forward, a second distance D12 backward, the first distance forward, and then the second distance D12 backward again so as to inform that the moving robot 100 waits for a user to move.

Meanwhile, it is desirable that the first distance D11 is a value small enough not to approach too closely to the obstacle, and the second distance D12 may be set to correspond to the first distance D11.

It is desirable that the moving robot 100 may travel the second distance D12 backward and then the second distance D12 not to go ahead of the first stop location so that the moving robot 100 does not approach the obstacle. That is, it is more desirable that the moving robot 100 repeatedly travels the second distance D12 backward, forward, backward, and then forward.

FIGS. 27 to 30 are diagrams illustrating specific examples of cropping and extracting a partial region from an image acquired by the image acquisition unit 120.

Figure 27:
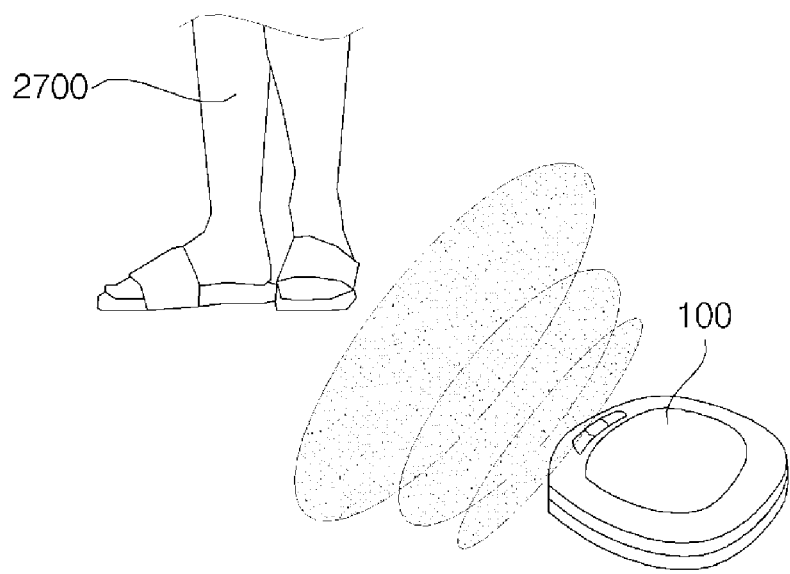

Referring to FIG. 27, during travelling, the moving robot 100 may detect an obstacle 2700, such as a human foot, using the sensor unit 170. FIG. 27 shows an example in which the obstacle 2700 is detected from the center in the moving direction of the moving robot 100.

Figure 28:
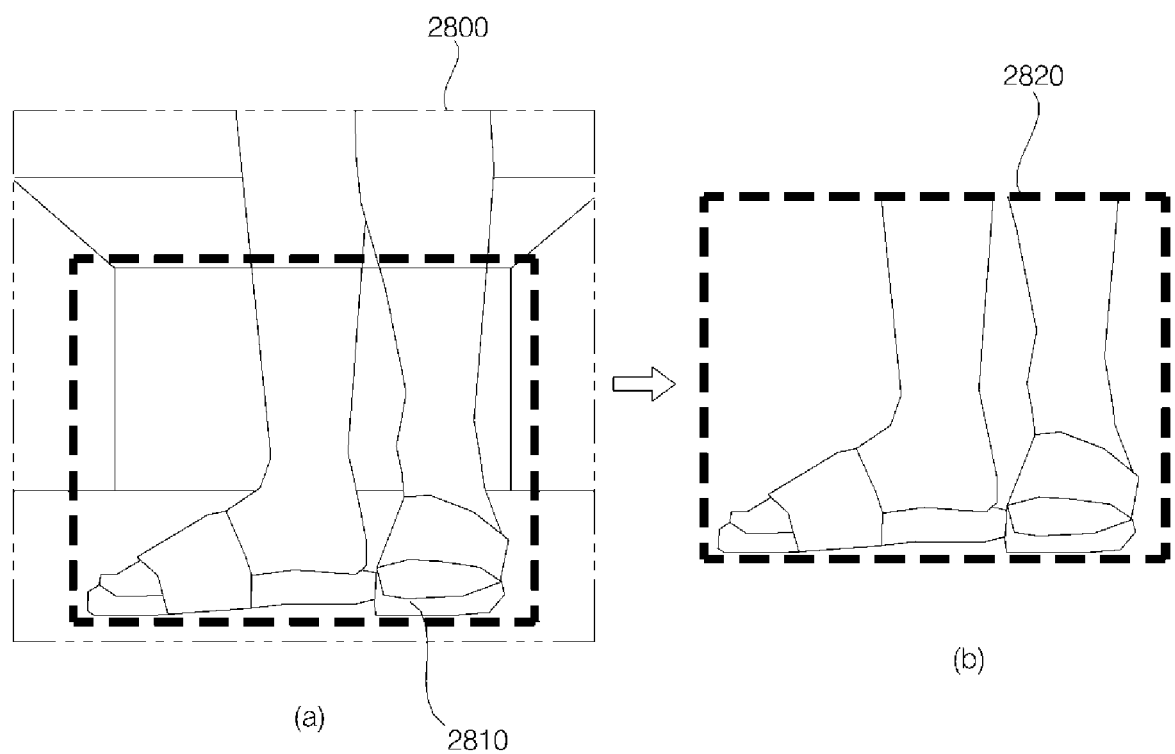

If the moving robot 100 detects the presence of the obstacle 2700 during travelling, the image acquisition unit 230 captures an area forward of the moving robot 100 and acquire an image 2800 including at least part of the obstacle 2700, as shown in (a) of FIG. 28.

The controller 140 may control the image acquisition unit 120 to extract a partial region 2810 from the acquired image 2800 in a direction from which the obstacle 2700 is detected by the sensor unit 170.

Referring to FIGS. 27 and 28, when the obstacle 2700 is detected from the front side of the body 110, the controller 140 may perform a control operation so as to extract a lower center region 2810 from an image acquired by the image acquisition unit.

Meanwhile, the controller 140 may use an extracted image 2820, as shown in (b) of FIG. 28, as input data to recognize an attribute of an obstacle.

Based on data that is pre-learned by machine learning, the obstacle recognition module 144 may recognize that an obstacle 2700 is a human foot. For example, a CNN, one of deep learning structures, is embedded in the obstacle recognition module 144, and the pre-trained CNN may recognize an attribute of an obstacle included in input data and output a result of the recognition.

Meanwhile, if the detected obstacle is not an obstacle which the moving robot 100 is able to go over, the driving control module 141 may control the travel unit 160 to perform avoidance driving, such as travelling after rotation.

Meanwhile, the extracted image 2820 may be stored in the storage unit 150. In addition, the original image 2800 acquired by the image acquisition unit may be stored in the storage unit 150 as well.

The extracted image 2820 stored in the storage unit 150 may be used as training data.

Meanwhile, when an obstacle is detected from the right side of the front surface of the body 110, the controller 140 may perform a control operation so as to extract a lower right region from the image acquired by the image acquisition unit 120. When an obstacle is detected from the left side of the front surface of the body 110, the controller 140 may perform a control operation so as to extract a lower left region from the image acquired by the image acquisition unit 120.

Figure 29:
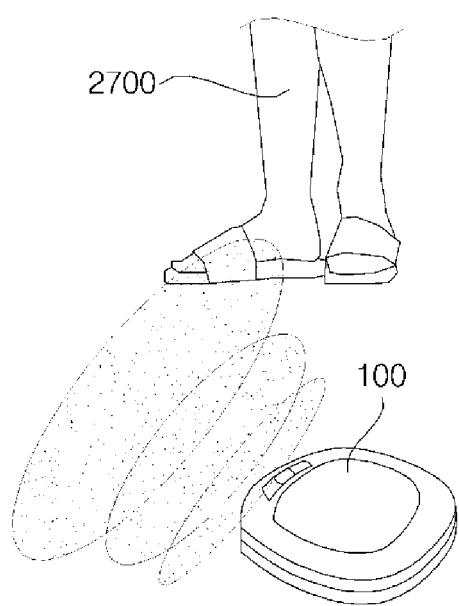

FIG. 29 shows an example in which the obstacle 2700 is detected from the right side in a moving direction of the moving robot 100.

Figure 30:
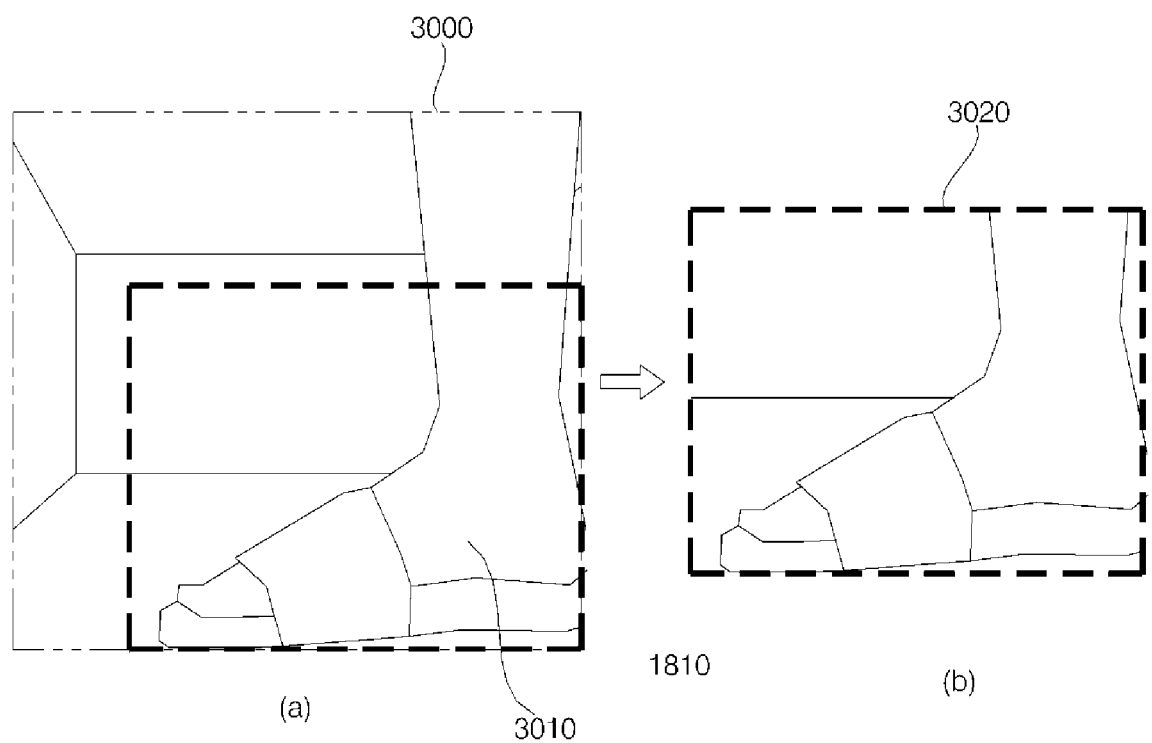

Referring to (a) of FIG. 30, when the obstacle 2700 is detected from the right side of the front surface of the body 110, the controller 140 may perform a control operation so as to extract a lower right region 3010 from an image 3000 acquired by the image acquisition unit 120.

As shown in (b) of FIG. 30, the controller 140 may use the extracted image 3020 as input data to recognize an obstacle attribute.

The present invention does not crop a center region of the image to a predetermined size, but it is able to extract the center, left, or right region from the image based on a direction from which an obstacle is detected.

Accordingly, obstacles as many as possible may be included in the input data used. A machine recognizes an element accounting for the greatest portion of an image, and thus, an obstacle attribute recognition rate may improve.

Meanwhile, the moving robot 100 travels on the floor in a specific space, and thus, if a low region is extracted from an acquired image, input data for recognition may include more obstacles.

The sensor unit 170 according to an embodiment of the present invention may include a first sensor disposed on the front surface of the body 110 of the moving robot 100, and second and third sensors spaced apart from the first sensor in the left and right directions.

In this case, the first sensor may operate as a transmitting part, and the second and third sensors may operate as receiving parts. For example, the first sensor may send an ultrasonic signal, and the second and third sensor may receive a signal reflected by an object. Upon reception of the signal reflected by the obstacle, it is possible to determine a direction in which the obstacle exists and a distance to the obstacle by using well known recognition methods using ultrasonic waves.

For example, if a distance between a detected obstacle and the second sensor is identical to a distance between the detected obstacle and the third sensor, it is possible to determine that the obstacle is detected from the center in the front side of the moving robot 100.

In this case, a specific region may be extracted from a low center part of an original image acquired by the image acquisition unit 120.

Meanwhile, if a distance between a detected obstacle and the second sensor is greater than a distance between the detected obstacle and the third sensor, it is possible to determine that the obstacle is detected on the right side of the front surface of the moving robot 100.

In this case, a specific region may be extracted from a lower right part of the original image acquired by the image acquisition unit.

The controller 140 may perform a control operation so as to shift and extract a target region from an image, acquired by the image acquisition unit 120, in proportional to a difference between the distance between a detected obstacle and the second sensor and the distance between the detected obstacle and the third sensor.

Meanwhile, the moving robot 100 according to an embodiment of the present invention may perform a learning process by using the extracted image as training data, thereby enabled to constantly update the ANN and DNN structures.

Alternatively, the moving robot 100 may transmit the extracted image to a specific server and receive machine learning-related data from the specific server. Then, the moving robot 100 may update the obstacle recognition module 144 based on the machine learning-related data received from the specific server.

Figure 31:
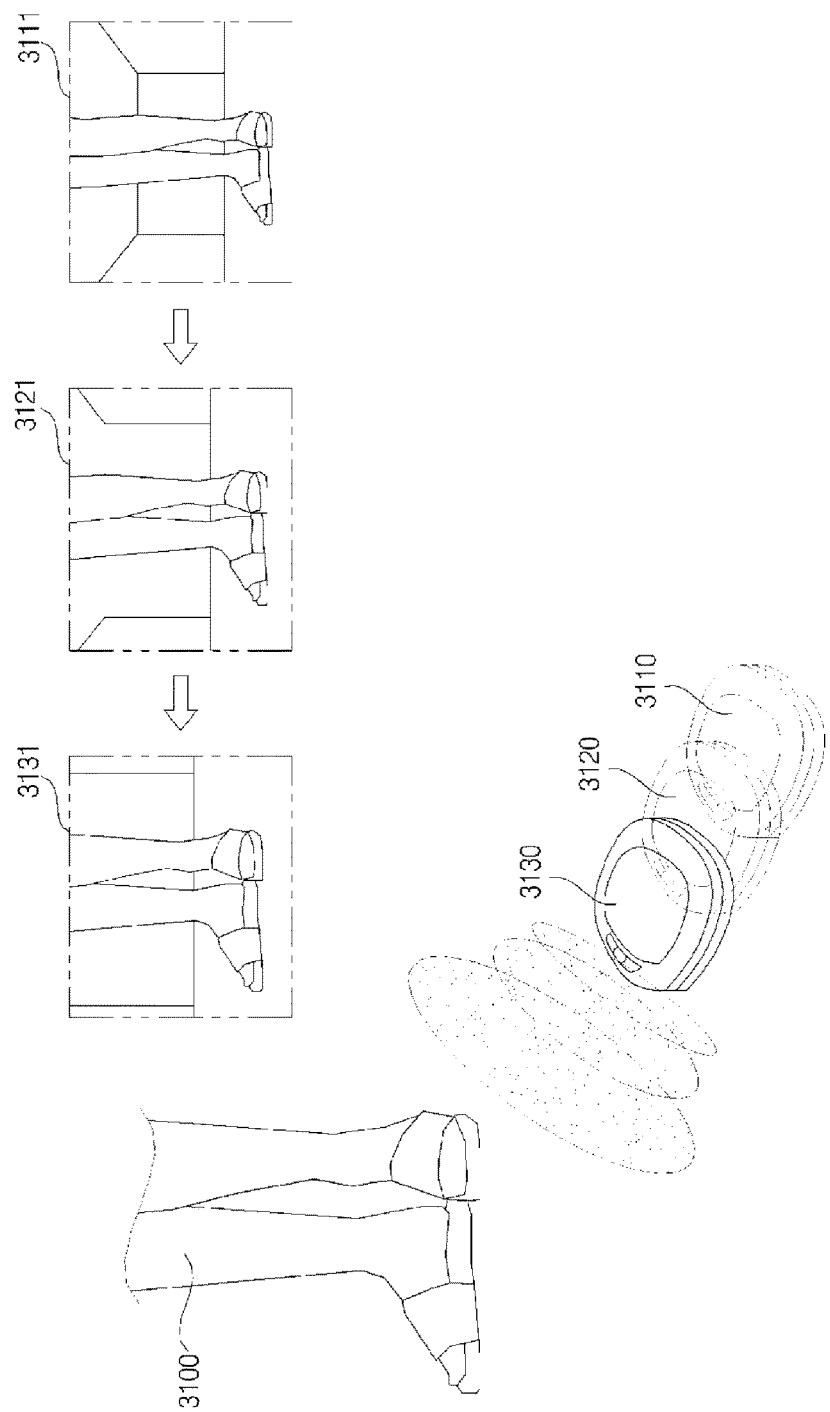
Figure 32:
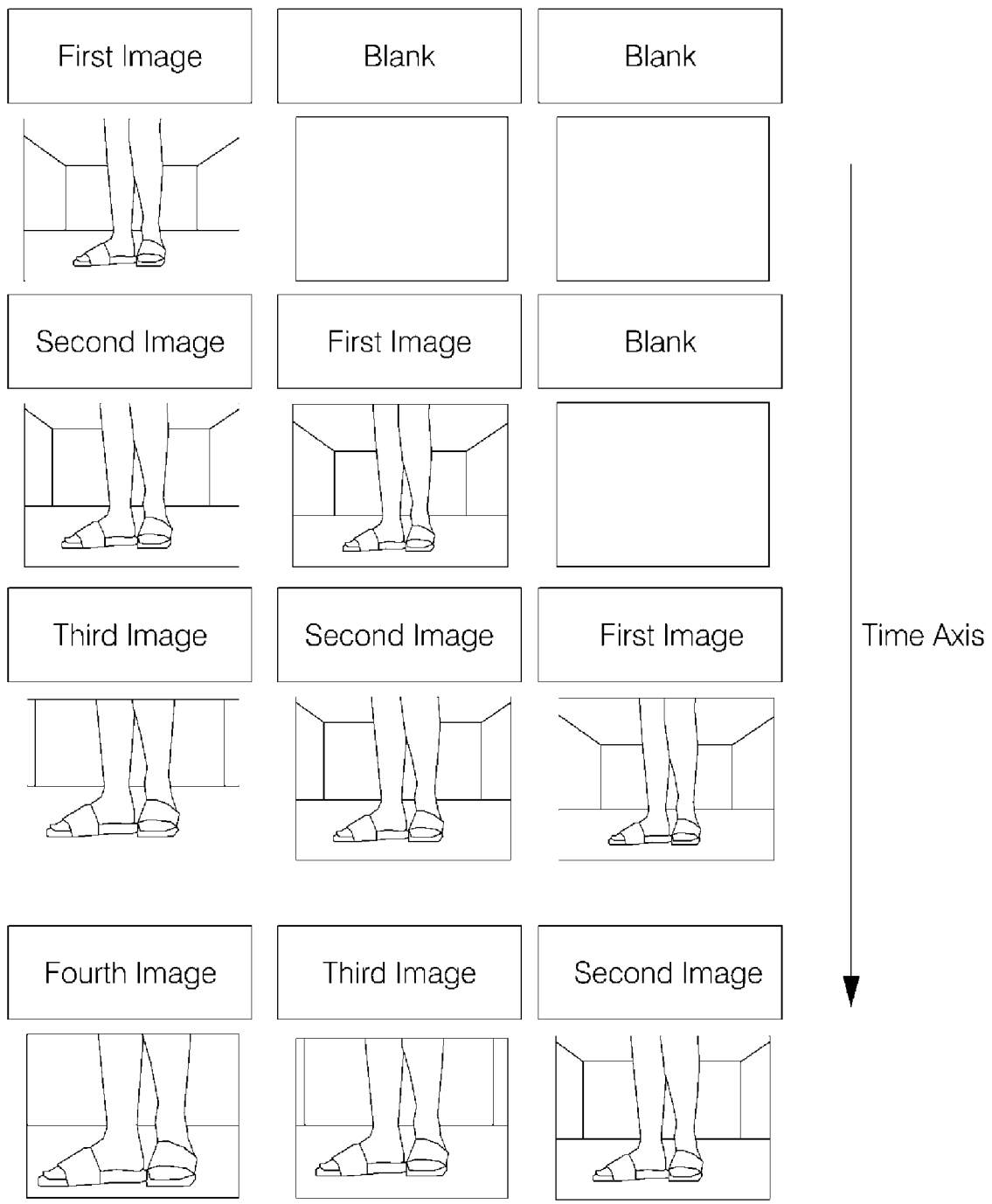

FIGS. 31 and 32 shows examples in which an image captured at a particular point in time is selected from among images acquired by the image acquisition unit 120 and used as obstacle recognition data.

FIG. 31 shows an example in which an obstacle 3100 is detected from the front side of the moving robot 100.

Referring to FIG. 31, the image acquisition unit 120 may keep capturing during travelling of the moving robot 100 to acquire a plurality of images. The moving robot 100 may acquire a first image 3111 at a first location 3110, a second image 3121 at a second location 3120, and a third image 3131 at a third location 3130.

Referring to FIG. 32, a preset number of images may be stored in the storage unit 150. In addition, if the preset number of images is acquired, an image captured at the earliest point in time may be deleted and a newly acquired image may be stored.

The moving robot 100 may start recognizing an image in accordance with a trigger signal caused by detection of an ultrasonic signal.

However, an ultrasonic sensor using a trigger signal has a short range, and thus, if the obstacle 3100 is detected and a trigger signal is received, a feature of a recognized subject may disappear from an acquired image 3131.

Thus, the present invention may store continuous images in the storage unit 150, determine whether the moving robot 100 moves forward in straight, and use, if a trigger signal is received, the first image 311 without using a third image 3131 so as to recognize an obstacle.

Usually, the moving robot 100 travels at a constant speed. Thus, an obstacle may be recognized simply by determining whether the moving robot 100 travels forward in straight and then selecting an image captured at a particular point in time, e.g., an image captured 2 frames earlier before the sensor unit 170 detects the obstacle.

In addition, considering a detection range of the sensor unit 170 and a speed of the obstacle recognition processing by the sensor unit 170, it is possible to determine which previous image captured how earlier than the detection time of the sensor 170 is to be selected.

Meanwhile, in some embodiments, the entire image captured at a selected point in time is not used as input image for obstacle recognition, but only a partial region from the corresponding image is extracted and recognized, thereby increasing a recognition rate.

According to an embodiment of the present invention, a moving robot may determine an attribute of an obstacle and adjust a driving pattern according to the attribute, thereby enabled to perform an obstacle recognizing operation and an avoidance driving operation at a high confidence.

In addition, according to at least one embodiment of the present invention, it is possible to acquire image data which increases accuracy of recognition of obstacle attribute.

In addition, according to at least one embodiment of the present invention, there may be provided a moving robot and a control method thereof, the moving robot which performs operations, such as travelling forward, travelling backwards, stopping, and making a detour, according to a result of recognition of an obstacle, thereby enhance the moving robot's stability and user convenience and improving driving efficiency, and cleaning efficiency.

In addition, according to at least one embodiment of the present invention, there may be provided a moving robot and a control method thereof, the moving robot which is able to accurately recognize an attribute of an obstacle based on machine learning.

In addition, according to at least one embodiment of the present invention, a moving robot is able to perform machine learning efficiently and extract data used for recognition of an obstacle attribute.

The moving robot according to the present invention is not limited to the configuration and the method of the aforementioned embodiments. Rather, the embodiments may be selectively combined to each other partially or wholly, for various modifications.

Meanwhile, the control method of a moving robot according to an embodiment of the present invention may be implemented as software in a processor-readable recording medium included in the electronic device. The processor-readable recording medium may include all types of recording devices storing data readable by a processor. Examples of the processor-readable recording medium may include a ROM, a RAM, a CD-ROM, a magnetic tape, a floppy disk, an optical data storage device, etc. In addition, the examples include a carrier-wave type implementation such as a transmission over the Internet. Furthermore, as the processor-readable recording medium is distributed to a computer system connected via a network, processor-readable code can be saved and executed in a distributed manner.

Further, even though preferred embodiments of the present invention have been illustrated and described, the present invention is not restricted to a certain embodiment described above, and various modifications and variations can be made by those skilled in the art without departing from the subject matter of the present invention as defined by the claims. Furthermore, these modified embodiments should not be understood separately from the spirit or scope of the present invention FIG. 1 is a diagram illustrating a method of detecting and avoiding an obstacle by an existing moving robot.

Referring to FIG. 1, a robot vacuum cleaner performs cleaning by sucks dusts and foreign substances while moving (S11).

An ultrasonic sensor detects an ultrasonic signal reflected by an obstacle and recognizes the presence of the obstacle (S12), and then whether or not a height of the obstacle is low enough for the cleaner to go over is determined (S13).

If it is determined that the obstacle is low enough for the robot vacuum cleaner to go over, the robot vacuum cleaner travels forward in straight (S14). If not, the robot vacuum cleaner may rotate by 90° (S15) and travel.

For example, if the obstacle is a low step, the robot vacuum cleaner recognizes the step and, if it is possible to go over the step, it goes over the step and keeps traveling.

However, if an obstacle considered for the robot vacuum cleaner to go over is a wire, the robot vacuum cleaner may be caught and constrained by the wire when travelling.

In addition, because a fan base has a height similar to or lower than a height of the step, it may be determined for the robot vacuum cleaner to go over. In this case, the robot vacuum cleaner may manage to climb the fan base but, at some point, wheels thereof may keep spinning without any traction.

In addition, if a movable obstacle, such as a human and a pet, moves, the obstacle may collide with the robot vacuum cleaner during avoidance driving of the robot vacuum cleaner.

In addition, the robot vacuum cleaner may move following a user who notices the movement of the robot vacuum cleaner and tries to avoid it, and therefore, the robot vacuum cleaner may disturb a user.

Thus, there is a need for a technology of identifying an attribute of an obstacle ahead and changing a moving pattern based on the attribute.

Meanwhile, artificial intelligence and machine learning, such as deep learning, are attracting more and more attentions.

Machine learning is a field of artificial intelligence, by which a computer learns data and performs a task, such as prediction and classification, based on the learned data.

The most famous definition of the machine learning is made by Tom M. Mitchell: "A computer program is said to learn from experience E with respect to some task T and some performance measure P if its performance on T, as measured by P, improves with experience E." That is, machine learning is to improve performance through experience E with respect to some task T.

Existing machine learning is mainly about classification, regression, and clustering models. In particular, in the case of map learning in regression, a user needs to define characteristics of learning data and a learning model for distinguishing new data based on the defined characteristics.

Meanwhile, deep learning technologies different existing machine learning has been recently developed. Deep learning is an artificial intelligent technology which allows a computer to learn itself based on Artificial Neural Networks (ANN). That is, deep learning is a technology by which a computer is able to discover and determine its characteristics by itself.

One of the triggers that accelerate the development of deep learning is a deep learning framework which is provided as an open source. For example, examples of the deep learning framework include: Theano from University of Montreal in Canada, Torch from New York University in the U.S.; Caffe from University of Buckley in California; and TensorFlow from Google.

As deep learning frameworks are made in public, it has become more important to use which learning process, which learning method, and which data extracted and selected for learning, for the sake of efficient learning and recognition.

In addition, efforts are being made to apply artificial intelligence and machine learning to various products and services.

Technical Field

An object of the present invention is to provide a moving robot and a control method, the moving robot which is able to determine an attribute of an obstacle and adjust a driving pattern based on the attribute so that it is possible to recognize the obstacle and perform avoidance driving at a high confidence.

Another object of the present invention is to provide a moving robot and a control method, the moving robot which is able to acquire image data to increase accuracy in recognition of obstacle attribute.

Another object of the present invention is to provide a moving robot and a control method, the moving robot which performs operations, such as travelling forward, travelling backwards, stopping, and making a detour, according to a result of recognition of an obstacle, thereby enhance the moving robot's stability and user convenience and improving driving efficiency, and cleaning efficiency.

Another object of the present invention is to provide a moving robot and a control method, the moving robot which is able to accurately recognize an attribute of an obstacle based on machine learning.

Another object of the present invention is to provide a moving robot and a control method, the moving robot which is able to perform machine learning efficiently and extract data used for recognition of obstacle attribute.

Technical Solution

In one general aspect of the present invention, there is provided a moving robot including: a travel unit configured to move a body; an image acquisition unit configured to acquire a surrounding image of the body; a sensor unit having one or more sensors configured to detect an obstacle while the body moves; a controller configured to: upon detection of an obstacle by the sensor unit, recognize an attribute of the obstacle based on an image acquired by the image acquisition unit, and control driving of the travel unit based on the attribute of the obstacle; and a sound output unit configured to: output preset sound when the recognized attribute of the obstacle indicates a movable obstacle. Accordingly, the moving robot improves stability, user convenience, driving efficiency, and cleaning efficiency.

In another general aspect of the present invention, there is provided a control method of a moving robot, the method including: detecting, by a sensor unit, an obstacle while a body of the moving robot moves; upon detection of an obstacle by the sensor unit, recognize an attribute of the obstacle based on an image acquired by an image acquisition unit; when the attribute of the obstacle indicates a movable obstacle, outputting preset sound; and controlling driving of a travel unit based on the attribute of the obstacle.

Advantageous Effects

According to an embodiment of the present invention, a moving robot may determine an attribute of an obstacle and adjust a driving pattern according to the attribute, thereby enabled to perform an obstacle recognizing operation and an avoidance driving operation at a high confidence.

In addition, according to at least one embodiment of the present invention, it is possible to acquire image data which increases accuracy of recognition of obstacle attribute.

In addition, according to at least one embodiment of the present invention, there may be provided a moving robot and a control method thereof, the moving robot which performs operations, such as travelling forward, travelling backwards, stopping, and making a detour, according to a result of recognition of an obstacle, thereby enhance the moving robot's stability and user convenience and improving driving efficiency, and cleaning efficiency.

In addition, according to at least one embodiment of the present invention, there may be provided a moving robot and a control method thereof, the moving robot which is able to accurately recognize an attribute of an obstacle based on machine learning.

In addition, according to at least one embodiment of the present invention, a moving robot is able to perform machine learning efficiently and extract data for recognition of an obstacle attribute.

[Insert original claims or claims not filed in the following format. An embodiment may be achieved in a whole or in parts by a . . . ]

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
a travel unit configured to move a body;
an image acquisition unit configured to acquire a plurality of surrounding image of the body continuously;
a sensor unit having one or more sensors configured to detect an obstacle while the body moves;
a controller configured to: upon detection of an obstacle by the sensor unit, recognize an attribute of the obstacle based on an image acquired by the image acquisition unit, and control driving of the travel unit based on the recognized attribute of the obstacle;
a sound output unit configured to: output preset sound when the recognized attribute of the obstacle indicates a movable obstacle; and
wherein the controller is further configured to: upon detection of an obstacle by the sensor unit,
based on a moving direction and a speed of the body, select an image captured at a particular point in time before the obstacle is detected by the sensor unit from among a plurality of continuous images; and
recognize the attribute of the obstacle included in the image captured at the particular point in time.

2. The moving robot of claim 1, wherein the movable obstacle is part of a human body or a pet.

3. The moving robot of claim 2, wherein the controller is further configured to stop moving the body when the recognized attribute of the obstacle indicates the movable obstacle.

4. The moving robot of claim 3, wherein the controller is further configured to resume previous movement when movement of the movable obstacle is detected within a particular standby time.

5. The moving robot of claim 4, wherein the controller is further configured to perform avoidance driving with respect to the movable obstacle when movement of the movable obstacle is not detected within the particular standby time.

6. The moving robot of claim 4, wherein the controller is further configured to control the body to move forward and backward repeatedly within a predetermined distance range.

7. The moving robot of claim 2, wherein the preset sound is alert sound, or a message for guiding the movable obstacle to move.

8. The moving robot of claim 1, wherein the controller is further configured to perform a control operation so that avoidance driving is performed in a different pattern based on the recognized attribute of the obstacle.

9. The moving robot of claim 1, wherein the controller comprises:
an obstacle recognition module configured to recognize the obstacle from the image, acquired by the image acquisition unit, based on data that is pre-learned using machine learning; and
a driving control module configured to control driving of the travel unit based on the attribute of the obstacle.

10. The moving robot of claim 9, further comprising: a communication unit configured to receive machine learning-related data from a specific server,
wherein the object recognition module is updated based on the machine learning-related data received from the specific server.

11. The moving robot of claim 9, further comprising: a storage unit configured to store a plurality of continuous images acquired by the image acquisition unit.

12. The moving robot of claim 1, wherein the controller is further configured to:
perform control operations comprising:
when the obstacle is detected from a forward right side of the body, extracting a lower right part of the image acquired by the image acquisition unit;
when the obstacle is detected from a forward left side of the body, extracting a lower left part of the image acquired by the image acquisition unit; and
when the obstacle is detected from a front side of the body, extracting a lower center part of the image acquired.

13. The moving robot of claim 1, wherein the controller is further configured to, when the moving speed is slower, select the image captured at an earlier point in time before the obstacle is detected by the sensor unit.

14. The moving robot of claim 1, wherein the controller is configured to extract a partial region from the image acquired by the image acquisition unit based on a direction from which the obstacle is detected by the sensor unit.

15. A control method of a moving robot, the method comprising:
detecting, by a sensor unit, an obstacle and acquiring by the image acquisition unit, a plurality of surrounding image of the body continuously while a body of the moving robot moves;
upon detection of the obstacle by the sensor unit, selecting an image captured at a particular point in time before the obstacle is detected by the sensor unit from among a plurality of continuous images acquired by the image acquisition unit based on a moving direction and a speed of the body;
recognizing an attribute of the obstacle included in the image captured at the particular point in time; and
controlling driving of a travel unit based on the recognized attribute of the obstacle.

16. The control method of claim 15, wherein the movable obstacle is part of a human body or a pet.

17. The control method of claim 16, further comprising: stopping moving the body when the recognized attribute of the obstacle indicates a movable obstacle.

18. The control method of claim 17, further comprising: detecting whether the movable obstacle moves within a particular standby time;
wherein previous movement of the body before the stopping is resumed when movement of the movable obstacle is detected within the particular standby time.

19. The control method of claim 18, further comprising: detecting whether the movable obstacle moves within a particular standby time,
wherein, when movement of the movable obstacle is not detected within the particular standby time, the controlling of driving of the travel unit based on the recognized attribute of the obstacle comprises controlling the travel unit to perform avoidance driving with respect to the movable obstacle.

20. The control method of claim 16, further comprising: extracting a partial region from an image acquired by the image acquisition unit based on a direction from which the obstacle is detected by the sensor unit.

* * * * *